(12) United States Patent
Hanna

(10) Patent No.: US 11,248,521 B1
(45) Date of Patent: Feb. 15, 2022

(54) FOUR STROKE RELATIVE MOTION CYLINDER WITH DEDICATED COMPRESSION SPACE

(71) Applicant: Ibrahim Hanna, Miami, FL (US)

(72) Inventor: Ibrahim Hanna, Miami, FL (US)

(*) Notice: Subject to any disclaimer, the term of this patent is extended or adjusted under 35 U.S.C. 154(b) by 0 days.

(21) Appl. No.: 16/998,771

(22) Filed: Aug. 20, 2020

Related U.S. Application Data

(63) Continuation-in-part of application No. 16/235,272, filed on Dec. 28, 2018, now Pat. No. 10,781,770, which is a continuation-in-part of application No. 15/847,711, filed on Dec. 19, 2017, now Pat. No. 10,788,060.

(51) Int. Cl.
| | |
|---|---|
| *F02B 9/00* | (2006.01) |
| *F02B 75/00* | (2006.01) |
| *F02F 1/18* | (2006.01) |
| *F02B 19/16* | (2006.01) |
| *F02B 75/04* | (2006.01) |
| *F02F 3/04* | (2006.01) |
| *F15B 15/14* | (2006.01) |
| *F15B 15/20* | (2006.01) |

(52) U.S. Cl.
CPC ............ *F02B 19/16* (2013.01); *F02B 75/042* (2013.01); *F02F 1/18* (2013.01); *F02F 3/042* (2013.01); *F15B 15/1428* (2013.01); *F15B 15/204* (2013.01); *F02B 2275/14* (2013.01); *F02B 2700/02* (2013.01); *F02B 2710/02* (2013.01); *F02B 2720/12* (2013.01); *F02B 2720/22* (2013.01)

(58) Field of Classification Search
CPC ........ F02B 71/04; F02B 63/041; F02B 25/08; F01B 7/02
See application file for complete search history.

(56) References Cited

U.S. PATENT DOCUMENTS

| | | | | |
|---|---|---|---|---|
| 5,117,789 | A | * | 6/1992 | Merritt ................ F02B 19/1028 123/289 |
| 5,893,343 | A | * | 4/1999 | Rigazzi ................... F02B 71/04 123/46 E |
| 7,159,544 | B1 | | 1/2007 | Studdert |
| 2006/0185631 | A1 | * | 8/2006 | Fitzgerald ............... F02B 71/00 123/55.5 |
| 2009/0101004 | A1 | | 4/2009 | Johnson |
| 2010/0066181 | A1 | * | 3/2010 | Keller .................... H02K 53/00 310/20 |

(Continued)

FOREIGN PATENT DOCUMENTS

EP      1424473 A1      6/2004

*Primary Examiner* — Long T Tran
(74) *Attorney, Agent, or Firm* — Mark Terry

(57) ABSTRACT

Implementations are disclosed herein that relate to a cylinder occupying structure. An example provides a cylinder system comprising a mechanical cylinder including an internal space in which a fluid is introduced, and a piston configured for reciprocating motion in the internal space, and a cylinder occupying structure including an insertion rod acting as a second piston, wherein the insertion rod is variably inserted into, and retracted from, the internal space of the cylinder in correspondence with the reciprocating motion of the piston and where parts of the insertion rod and the piston may surround the combustion space, and where fluid compression and fluid combustion is conducted within separate spaces.

27 Claims, 37 Drawing Sheets

(56) References Cited

U.S. PATENT DOCUMENTS

| | | | | |
|---|---|---|---|---|
| 2010/0186689 | A1* | 7/2010 | Tour | F02B 75/282 |
| | | | | 123/53.6 |
| 2012/0047884 | A1* | 3/2012 | McBride | F03G 6/00 |
| | | | | 60/327 |
| 2014/0116389 | A1* | 5/2014 | Khurgin | F02B 75/002 |
| | | | | 123/46 A |
| 2015/0001852 | A1* | 1/2015 | Cockerill | H02K 5/20 |
| | | | | 290/1 A |
| 2015/0184614 | A1* | 7/2015 | Langenfeld | F16J 15/52 |
| | | | | 60/517 |
| 2016/0010544 | A1* | 1/2016 | Hamann | H02K 7/1815 |
| | | | | 123/2 |
| 2016/0348551 | A1* | 12/2016 | Paul | F02G 5/00 |
| 2017/0012571 | A1* | 1/2017 | Cristoforo | H02K 35/02 |
| 2017/0107894 | A1* | 4/2017 | Ocampo | F02B 19/04 |

* cited by examiner

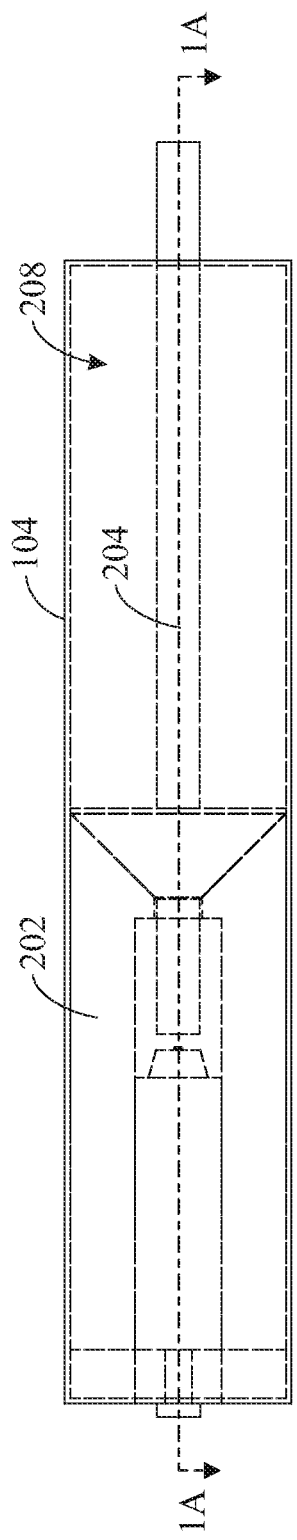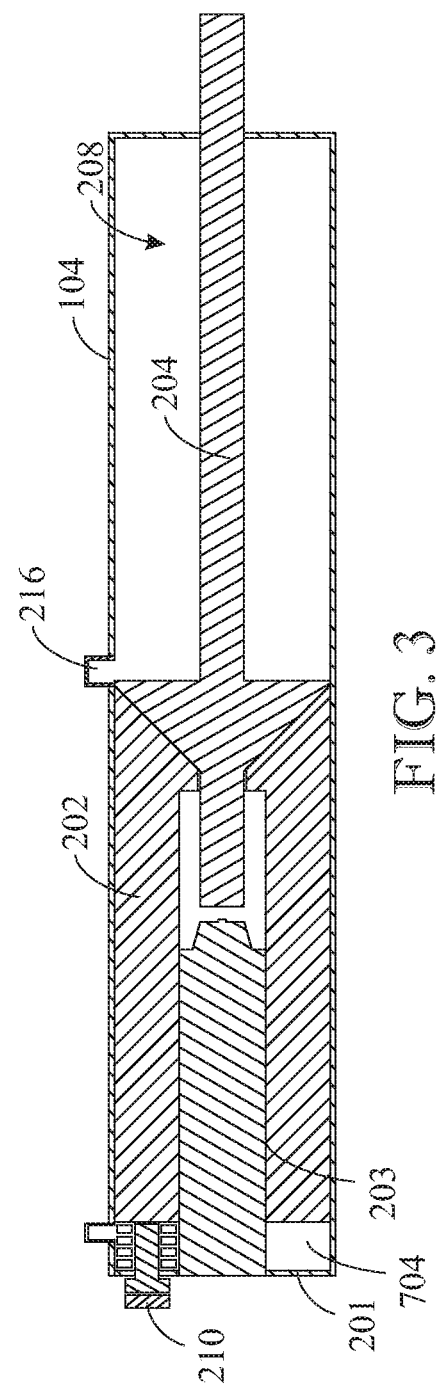
FIG. 2
FIG. 3

Exhaust Mass Fractions using ANSYS Analysis

| Simulation | O2 | N2 | C12H23 | H2O | CO | CO2 | No2 | | other products |
|---|---|---|---|---|---|---|---|---|---|
| D1-T3 (0.012 sec) Conventional piston | 10,16 % | 71,52 % | 2,13 % | 3,96 % | 4,43 % | 7,59 % | 0,0135 % | 0,00005398 % | 0,1964 % |
| D3-T10 (0.022 sec) | 9,48 % | 73,12 % | 0,391 % | 4,45 % | 1,76 % | 10,67 % | 0,0147 % | 0,00017278 % | 0,11413 % |

FIG. 26

| Simulation | C12H23 | O2 | N2 | NO | No2 | CO | Co2 | H2O | Another Products |
|---|---|---|---|---|---|---|---|---|---|
| Conventional Cylinder 50 mg fuel, 150 psi | 2,000000% | 7,540000% | 71,020000% | 0,011000% | 0,000050% | 4,590000% | 9,390000% | 5,160000% | 0,288950% |
| Relative Moton 50 mg Fuel | 0,000000% | 3,108585% | 72,551693% | 0,002738% | 0,000043% | 0,000001% | 16,663243% | 5,160000% | 0,000039% |
| Relative Motion 25 mg fuel 150 psi | 0,000027% | 0,000654% | 71,090000% | 0,000006% | 0,000001% | 2,829366% | 18,636330% | 7,239617% | 0,203999% |

FIG. 39

FOUR STROKE RELATIVE MOTION CYLINDER WITH DEDICATED COMPRESSION SPACE

CROSS REFERENCE TO RELATED APPLICATIONS

This U.S. non-provisional patent application is a continuation-in-part of co-pending U.S. non-provisional patent application Ser. No. 16/235,272, filed on Dec. 28, 2018, which is a continuation-in-part of U.S. non-provisional patent application Ser. No. 15/847,711 filed on Dec. 19, 2017 all of which are incorporated-by-reference herein in their entireties.

FIELD OF THE INVENTION

The present invention relates generally to mechanical devices used to perform work, and more particularly to hydraulic and combustion cylinders.

BACKGROUND OF THE INVENTION

A wide variety of devices utilize cylinders to perform mechanical functions and produce useful work. A typical internal combustion engine (ICE), for example, employs a number of cylinders in which a fuel-air mixture is compressed and combusted to produce work that is imparted to a respective reciprocating piston. Each piston may be coupled to a crankshaft, with which forces imparted to the pistons can be transmitted, through various intermediate devices, to the wheels of a vehicle to thereby propel the vehicle.

Non-ICE engines and other devices may utilize cylinders in producing work. A hydraulic system, for example, may employ a cylinder having a piston operable to push hydraulic fluid in the cylinder, where pressure applied to the hydraulic fluid by the piston can be transmitted to other components in the hydraulic system in accordance with Pascal's principle. As a specific example, a hydraulic lift may employ two hydraulic cylinders in fluidic communication to obtain a multiplication in output force: an output cylinder used to lift an object such as a vehicle may be configured with a larger area throughout which the output force is distributed so as to multiply the input force applied to an input cylinder having a relatively smaller area throughout which the input force is applied.

When configured for use in an ICE, hydraulic system, or in other contexts, a typical cylinder produces output (e.g., power, force) that is proportional to its stroke volume (e.g., the volume through which a piston surface travels) which is the product of a piston surface and stroke distance (e.g., the axial distance through which the piston surface travels). Accordingly, previous systems (e.g., gasoline and diesel ICEs) have turned to increased stroke volumes and/or distances to increase cylinder output. Increasing stroke volume and/or distance may stipulate an increase in cylinder dimensions and thus cylinder mass, however, reducing the overall economy of an engine and vehicle in which such enlarged cylinders are used.

Other approaches to increasing engine/vehicle economy may include the use of a recovery system. Hydraulic cylinders, for example, may be coupled to a hydraulic or turbo charger or to an electrical recovery system, though such recovery systems frequently exhibit limited efficiencies (e.g., 20-30%) especially when they work against a high initial pressure around 1000 psi. In the case of a hydraulic recovery system, in which unused mechanical forces may be redirected to pump fluids into a pressure accumulating storage chamber for later cylinder intake, the operating fluid intake may be originally accumulated under low efficiency recycling methods based on pumping against high head accumulators. Minimizing requirements of the upper limits of compression ratios is a way to provide better energy recovery results in a vehicle. While pressurized fluid input or cylinder input pressure can be reduced to increase overall hydraulic system efficiency, cylinder output may correspondingly decrease, as in some configurations the output power of a hydraulic cylinder is proportional to the product of effective head pressure and fluid flow. Moreover, the limited efficiency of cylinder-based systems is further compounded when considering the energy expended in producing the compressed fluids provided as input to a cylinder, such as the energy required to accumulate pressurized fluid for hydraulic cylinders, and the energy required to refine and transport combustible fuel for combustion cylinders.

Direct injection engine methods have been implemented for the purpose of satisfying clean environment requirements, but it has become more challenging to satisfy such requirements. Two stroke engines, for example, which are desired for having lesser moving parts, are completely prohibited in certain areas due to their tendency of releasing excessive amounts of non-completely burned exhaust and it is also not energy effective due to losing compressed fluids before they enter into a next combustion phase. Wankel rotary engines are favorable because they have less parts, but are limited in their energy output.

The existing throttle method for slowing down a vehicle is usually done through releasing a non-completely burned fluid during expansion cylinder stroke to release pressure that is acting on its piston. Fluid intake pathways in direct injection engines, suffer from buildup of unburned exhaust that may leak backward within the engine. Further, releasing non-burned fluid causes pollution and is a waste of fuel. Further, it is known that higher initial pressures in supercharged engines cause high temperatures and subsequent damage due to high temperatures.

In view of the above, there exists a need for a mechanism to meet environmental requirements of a combustion engine by optimizing cylinder pressure while minimizing the release of unburned fluids or losing compressed fluids, while still achieving excellent power output.

SUMMARY OF THE INVENTION

This summary is provided to introduce a selection of concepts in a simplified form that are further described below in the detailed description. This summary is not intended to identify key features of essential features of the claimed subject matter, nor is it intended to be used to limit the scope of the claimed subject matter. Furthermore, the claimed subject matter is not limited to implementations that solve any or all disadvantages noted in any part of this disclosure.

According to embodiments of the present disclosure, a cylinder system is disclosed, the cylinder system comprising a mechanical cylinder including an internal space in which a fluid is introduced, and a crankshaft piston configured for reciprocating motion in the internal space; and a cylinder occupying structure including an insertion rod, wherein the insertion rod is variably advanced into, and retracted from, the internal space of the cylinder in correspondence with the reciprocating motion of the crankshaft piston and wherein the insertion rod partially or completely contains or surrounds a combustion space.

In another aspect, the insertion rod displaces a portion of the internal space, such that a volume of the internal space occupied by the fluid is less than an intrinsic volume of the internal space.

In another aspect, the insertion rod reduces a fluid intake corresponding to a given stroke of the crankshaft piston.

In another aspect, the insertion rod may be a fixed structure, or it may perform as a second piston that may, through a mechanical link, magnetic control, or hydraulic communication, add a secondary force to selectively, dynamically, and controllably increase and/or decrease cylinder internal pressure during expansion or compression strokes, respectively, as required by the particular application of the system.

In another aspect, triggering the electromagnetic actuator at each mechanical cycle is substantially initiated by mechanical or magnetic sensors that monitor and respond to throttle pedal position.

In another aspect, the cylinder system further comprises a controller mechanism configured to control the cylinder occupying structure via an electromagnetic actuator.

In another aspect, the electromagnetic actuator includes, in one embodiment, an electrical system configured to supply a DC current to a coil and thereby generate a magnetic field, and comprising a non-alternating poles orientation configured to apply its forces as either a repelling or attraction action to change or enforce the movement of the insertion rod during an expansion stroke.

In another aspect, the magnetic field interacts with a permanent magnet in the insertion rod to variably remove the insertion rod from, the internal space of the cylinder during the expansion stroke.

In another aspect, the insertion rod is variably advanced into the internal space of the cylinder via a mechanical actuator, or via a hydraulic charger.

In another aspect, the insertion rod is advanced into the internal space of the cylinder during an expansion stroke of the cylinder, the expansion stroke primarily initiated by forces of combustion, and the insertion rod is retracted from the internal space of the cylinder during a compression stroke of the cylinder, along with the retracting crankshaft piston.

In another aspect, the cylinder is a hydraulic cylinder, and the fluid is a hydraulic fluid primarily injected within a space surrounded by a crankshaft piston and the insertion rod (occupying structure).

In another aspect, the cylinder is a combustion cylinder, and the fluid is a combustible fluid.

In another aspect, the insertion rod undergoes motion at a substantially same rate as the crankshaft piston and in the same or opposite direction of the crankshaft piston's location during an expansion stroke and in the same direction as the crankshaft piston's motion during the compression stroke.

In another example, disclosed is cylinder system, comprising: a mechanical engine cylinder including an internal space in which a fluid is introduced, and a crankshaft piston configured for reciprocating motion in the internal space, and a cylinder occupying structure including an insertion rod being a second piston, wherein the insertion rod is variably advanced into, and retracted from, the internal space of the cylinder in correspondence with the reciprocating motion of the crankshaft piston.

In another aspect, the insertion rod displaces a portion of the internal space, such that a volume of the internal space occupied by the fluid is less than an intrinsic volume of the internal space.

In another aspect, the insertion rod reduces a fluid intake corresponding to a given stroke of the crankshaft piston.

In another aspect, the system further comprises a controller configured to control the cylinder occupying structure via an electromagnetic actuator or via a hydraulic or turbo charger.

In another aspect, the electromagnetic actuator includes an electrical system configured to supply a DC current to a coil and thereby generate a magnetic field dedicated to provide dedicated repelling or attraction forces.

In another aspect, the magnetic field interacts with a permanent magnet in the insertion rod to variably advance or retract the insertion within, the internal space of the cylinder during an expansion stroke.

In another aspect, the insertion rod is variably inserted into, and retracted from, the internal space of the cylinder via a mechanical actuator.

In another aspect, the mechanical hydraulic or turbo actuator includes a spring that converts kinetic energy of the insertion rod into potential energy of the spring.

In another aspect, the insertion rod is advanced into the internal space of the cylinder during an expansion stroke of the cylinder, and wherein the insertion rod is completely retracted from the internal space of the cylinder during a compression stroke of the cylinder; and wherein the insertion rod is further advanced or retracted from a certain position during an expansion stroke.

Disclosed as yet another example is: at a mechanical cylinder system including a cylinder, a method, comprising: actuating a crankshaft piston of the cylinder during an expansion stroke in a first direction, during the expansion stroke, advancing a cylinder occupying structure into an internal space of the cylinder in correspondence with motion of the crankshaft piston, actuating the crankshaft piston of the cylinder during a compression stroke in a second direction substantially opposite to the first direction, and during the compression stroke, retracting the cylinder occupying structure from the internal space of the cylinder in correspondence with the motion of the crankshaft piston.

In another aspect, the combustion space is partially contained or surrounded by the body of the insertion rod.

In another aspect, the internal surface of the actuating crankshaft piston partly or completely has a cone shape.

In another aspect, the insertion rod is a second cylinder that may change the direction of its acceleration during an expansion stroke.

Disclosed as another example is, a method of performing 2 engine strokes per cylinder combustion, using 2 internal pistons where such two pistons provide four stroke functions of a four-stroke engine including air intake, air compression, power stroke and exhaust strokes.

Disclosed as another example is, a method of increasing engine acceleration by increasing the internal cylinder pressure through the delivery of compressed fluid in the space behind an insertion rod.

As another example, disclosed is a method of decelerating an engine through moving an insertion rod piston in an opposite direction of the crank shaft, causing a decrease in cylinder internal pressure and a decrease in crank shaft power without the need for an early release of the unburned exhaust.

In another aspect, the cylinder occupying structure is further advanced and retracted via an electromagnetic actuator, hydraulic press supercharger or turbocharger.

In another example, disclosed is a method for hybrid electromagnet-petrol cylinder drive, or hybrid hydraulic-petrol cylinder drive where a second piston communicates secondary pressure forces to a crank shaft linked piston.

In another aspect, the electromagnetic actuator includes an electrical system configured to supply current to one or more coils and thereby generate one or more magnetic fields.

Disclosed in another example is a method of enhancing an energy return of a second piston linked electromagnet by assigning such electromagnet a one repelling or attraction task.

In another aspect, the cylinder occupying structure is advanced and retracted via a mechanical actuator.

In another aspect, the mechanical actuator includes a spring that converts kinetic energy of the insertion rod into potential energy of the spring.

In another aspect, the cylinder is a combustion cylinder, the method further comprising injecting a combustible fuel into the cylinder prior to the compression stroke.

In another aspect, the cylinder is a hydraulic cylinder, the method further comprising compressing, via the cylinder, a hydraulic fluid during the compression stroke.

Disclosed in another example is a cylinder system comprising: a mechanical engine cylinder including an internal space in which a fixed non-moving occupying structure is installed surrounding a combustion space, engaged with part of the reciprocating crankshaft piston in a way where combustion pressure is applied to smaller surface area of the crankshaft piston during an early part of the expansion stroke and to bigger surface area of the crankshaft piston during a later part of the expansion stroke.

Disclosed in yet another example is a cylinder system, comprising: a mechanical engine cylinder including an internal space in which a fluid is introduced, and a crankshaft piston configured for reciprocating motion in the internal space, a cylinder occupying structure including an insertion rod as a second piston, wherein the insertion rod is variably advanced as a second piston in a first direction during an expansion stroke of the cylinder, and retracted from in a second direction substantially opposite to first direction during a compression stroke wherein the insertion rod partially surrounds the combustion space, wherein the cylinder occupying structure is moved initially by the combustion forces to a certain distance after which it further advances or retracts by an electromagnetic or hydraulic actuator.

Disclosed as yet another example, is a mechanical engine cylinder system, comprising: a cylinder including an internal space, an occupying structure, and a crankshaft piston, wherein the internal space of the cylinder is modified by the occupying structure such that combustion pressure applied to the crankshaft piston is applied to a smaller surface area of the crankshaft piston during an early part of an expansion stroke and to a larger surface area of the crankshaft piston during a later part of the expansion stroke.

In another aspect, the system is configured such that combustion occurs within a cavity of the occupying structure to apply combustion pressure to both the occupying structure and the crankshaft piston.

In another aspect, the occupying structure is a movable structure relative to the cylinder, and wherein movement of the occupying structure controlled by one or more forces applied by a force application mechanism.

In another aspect, the force application mechanism is responsive to throttle position by way of throttle position sensors such that one or more forces applied to the occupying structure are dependent on throttle position.

In another aspect, the force application mechanism is configured to apply a retracting force to the occupying structure during the expansion stroke.

In another aspect, the force application mechanism is configured to apply an advancing force to the occupying structure during the expansion stroke.

In another aspect, the system is configured to partially execute a compression stroke function during the expansion stroke by pumping fresh air behind the occupying structure via the force application mechanism.

In another aspect, the system is configured to perform intake, compression, expansion, and exhaust functions within two strokes per combustion.

In another aspect, the force application mechanism includes an electromagnetic actuator.

In another aspect, the force application mechanism includes a hydraulic system.

In another aspect, the force application mechanism includes a forced induction system.

In another aspect, the system is configured to deliver fluid to an intake side of the occupying structure to increase cylinder pressure and engine acceleration.

In another aspect, the system is configured to cause engine deceleration by applying a retracting force to the occupying structure.

In another aspect, the system is configured to cause engine acceleration by applying an advancing force to the occupying structure.

In another aspect, the system is configured to have the initial movement of the occupying structure drag the combustion fluids and forces in the direction of the crankshaft piston to absorb part of the engine vibration forces.

In another aspect, the occupying structure changes direction during the expansion stroke.

In another aspect, the system is configured to perform intake, compression, expansion, and exhaust functions within two strokes per combustion.

As yet another example, disclosed is a mechanical engine cylinder system, comprising: a cylinder including an internal space; an occupying structure; and a crankshaft piston; wherein the internal space of the cylinder is modified by the occupying structure, having dedicated compression and dedicated combustion spaces; wherein the occupying structure provides a surface interface with the dedicated compression space, and wherein the occupying structure completely contains within its cavity, a primary combustion space, during an early stage of a power stroke, and wherein, the occupying structure has an edge, that separates the primary and secondary combustion spaces, wherein combustion pressure applied to the crankshaft piston is applied to a smaller surface area of the crankshaft piston during an early part of an expansion stroke and to a larger surface area of the crankshaft piston during a later part of an expansion stroke, and wherein combustion pressure applied to occupying structure, applies a net-force to the occupying structure, in the direction of the crankshaft piston, during early part of an expansion stroke, and in the direction of camshaft side during a later part of an expansion stroke, wherein surfaces of occupying structure, and crankshaft piston, are sized such that, a disengagement happens during an expansion stroke, between the occupying structure and crankshaft piston; and wherein the motion of occupying structure, during an early part of expansion stroke, creates a suction force of compression fluid into the dedicated compression space.

In another aspect, the system is configured such that combustion occurs within a cavity of the occupying structure, with a diameter smaller than the internal diameter of cylinder.

In another aspect, time of acceleration is reduced, such that a stroke power output can be done using less fuel requirement.

In another aspect, the occupying structure cavity, has an edge facing toward the camshaft and cylinder head.

In another aspect, the occupying structure edge, causes turbulent motion of combustion fluid for more complete burning.

In another aspect, an edge under pressure within the cavity of occupying structure, causes a progressive advance of occupying structure within the cylinder, competing with combustion fluid for space, and causing less fluid intake requirements.

In another aspect, the engagement of the occupying structure and crankshaft piston, is a cone shape engagement.

In another aspect, the advance of occupying structure under combustion forces, creates suction forces of compression fluid.

In another aspect, the surface sizing of the occupying structure and of crankshaft piston, balances combustion forces, such that disengagement happens without mechanical interference during a power stroke.

In another aspect, the occupying structure is responsive to a force application mechanism.

In another aspect, the force application mechanism is responsive to throttle position by way of throttle position sensors such that one or more forces applied to the occupying structure are dependent on throttle position.

In another aspect, the force application mechanism is configured to apply a retracting force to the occupying structure during the expansion stroke.

In another aspect, the force application mechanism is configured to apply an advancing force to the occupying structure during the expansion stroke.

In another aspect, any turbocharge forces used to increase fluid compression, during an early part of a power stroke, is part of a force application mechanism.

In another aspect, the force application mechanism includes electromagnetic actuator.

In another aspect, the force application mechanism includes a magnetic induction system.

In another aspect, the force application mechanism includes a hydraulic system.

In another aspect, the system is configured to cause engine deceleration by applying a retracting force to the occupying structure.

In another aspect, the system is configured to cause engine acceleration by applying an advancing force to the occupying structure.

In another aspect, the cylinder is cooled by a cooling jacket.

In another aspect, the advance of occupying structure, decompresses part of compressed fluid remaining out of the combustion space, providing a cooling effect to the cylinder head.

In another aspect, the advance of occupying structure, by dragging combustion fluid, minimizes the vibration caused by initial forces of combustion.

In another aspect, four independent strokes, are carried in two separate compression and combustion spaces.

In another aspect, four strokes are performed along with every reciprocating cycle of a crankshaft piston.

In another aspect, friction between crankshaft piston and cylinder, is reduced as a function of time, where every stroke of a four-stroke Relative Motion cylinder, is a power stroke.

In another aspect, the occupying structure is a movable part relative to the cylinder.

Furthermore, disclosed is a method of introducing an occupying structure within a cylinder system, the system including a cylinder including an internal space, and the system including a crankshaft piston, the method comprising: modifying an internal space of a cylinder using the occupying structure such that pressure applied to the crankshaft piston is applied to a smaller surface area of the crankshaft piston during an early part of an expansion stroke and to a larger surface area of the crankshaft piston during a later part of the expansion stroke;

and executing a pressure-increasing action within a cavity of the occupying structure to apply pressure to both the occupying structure and the crankshaft piston, such that, the occupying structure accelerates in the direction of the crankshaft during an early stage of power stroke, and in opposite direction during a later stage of power stroke, due to changing the direction of net force applied to occupying structure surfaces;

wherein the occupying structure includes an elongated cylindrical body to be accommodated within the internal space, the elongated cylindrical body defines a first cavity of primary space and a second cavity of a secondary space;

wherein the occupying structure competes with fluid in filling the space of displaced volume created by the motion of a crankshaft piston during an expansion stroke; and wherein the occupying structure is introduced such that volume filled by the combustion fluid is smaller than the volume displaced by the crankshaft piston due to the occupying structure competing with combustion fluid for space within the cylinder.

In another aspect, the cylinder is a hydraulic cylinder, and wherein the fluid is a hydraulic fluid.

In another aspect, the cylinder is a combustion cylinder, and wherein the fluid is a combustible fluid.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the claimed subject matter will hereinafter be described in conjunction with the appended drawings provided to illustrate and not to limit the scope of the claimed subject matter, where like designations denote like elements, and in which:

FIG. 2 shows a first exemplary cylinder occupying structure, in accordance with aspects of the present disclosure;

FIG. 3 shows a cross sectional view taken along plane 1A-1A in FIG. 2, in accordance with aspects of the present disclosure;

FIGS. 20-32 show various graphs and a table showing the benefits of the disclosed cylinder occupying systems (D2, D3, D4) over conventional systems (D1)

FIG. 39 shows a table of values for various product emissions for various designs;

It is to be understood that like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 7:
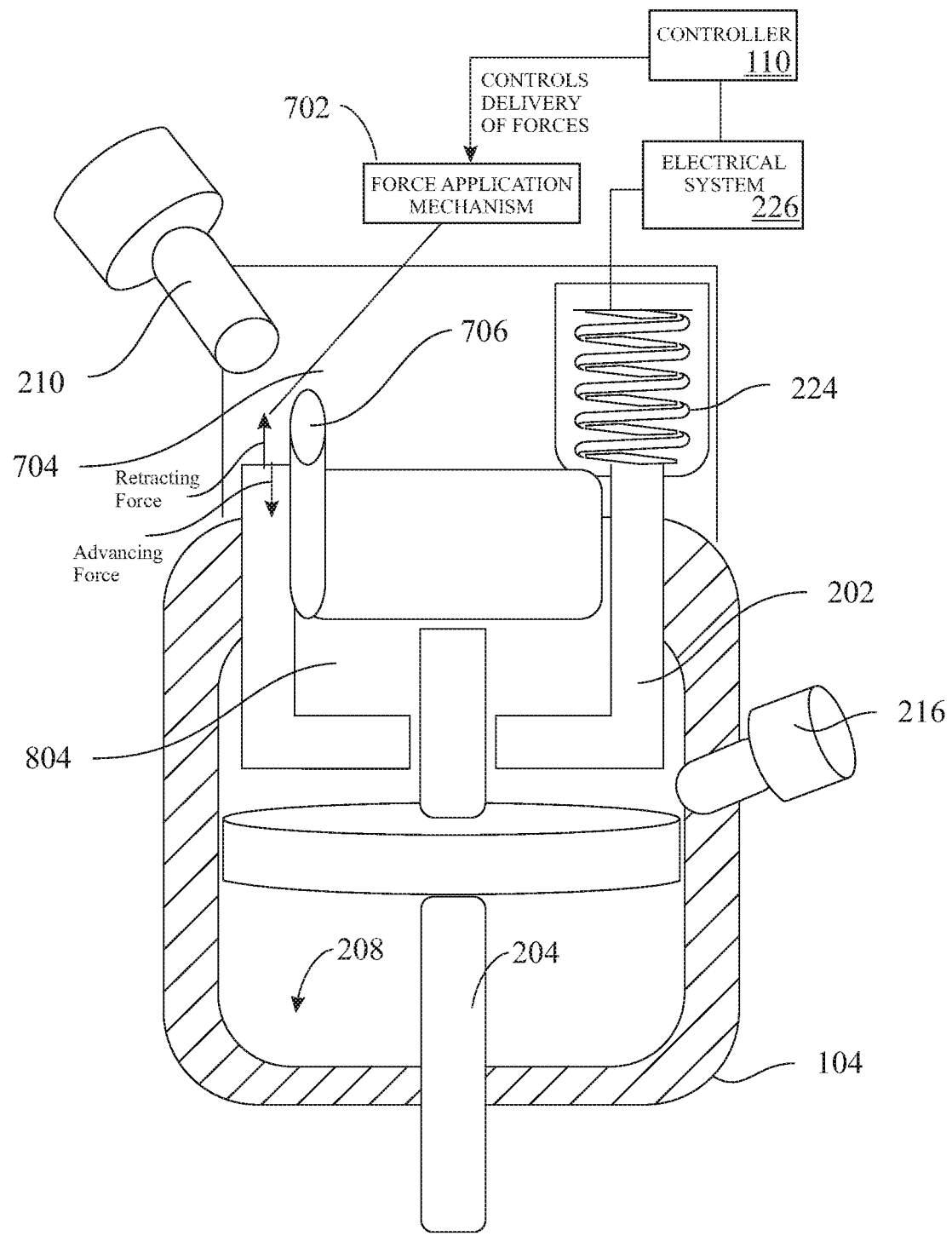
FIG. 7 schematically shows various components of an exemplary cylinder occupying system, in accordance with aspects of the present disclosure.

It is to be understood that "downward" with respect to FIG. 7 corresponds to "rightward" or "right" with respect to FIGS. 2-6, and 8-18, and vice versa.

Disclosed is a cylinder occupying structure. An example provides a cylinder system comprising a mechanical cylinder including an internal space in which a fluid is introduced, and a crankshaft piston configured for reciprocating motion in the internal space, and a cylinder occupying structure including an insertion rod, wherein the insertion rod is variably inserted into, and retracted from, the internal space of the cylinder in correspondence with the reciprocating motion of the crankshaft piston. As shown in the figures, a combustion space is located within walls of an occupying structure.

Figure 1:
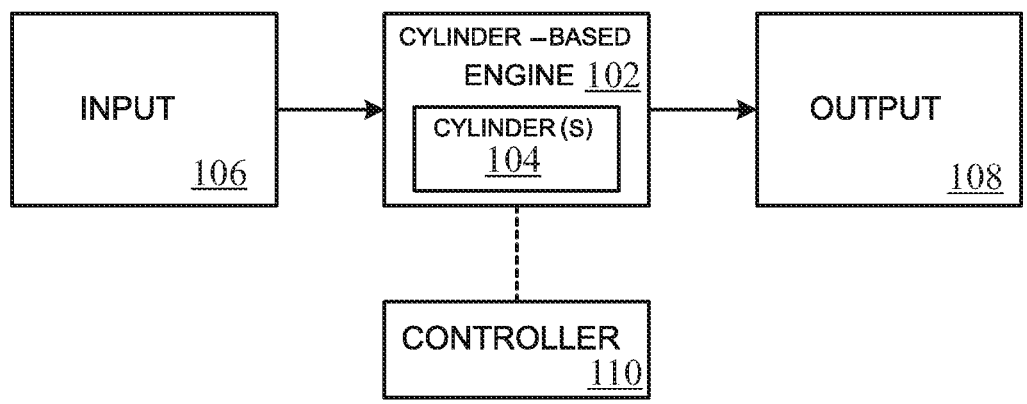
FIG. 1 schematically shows an example of an engine system including an improved cylinder system, in accordance with aspects of the present disclosure.
Figure 4:
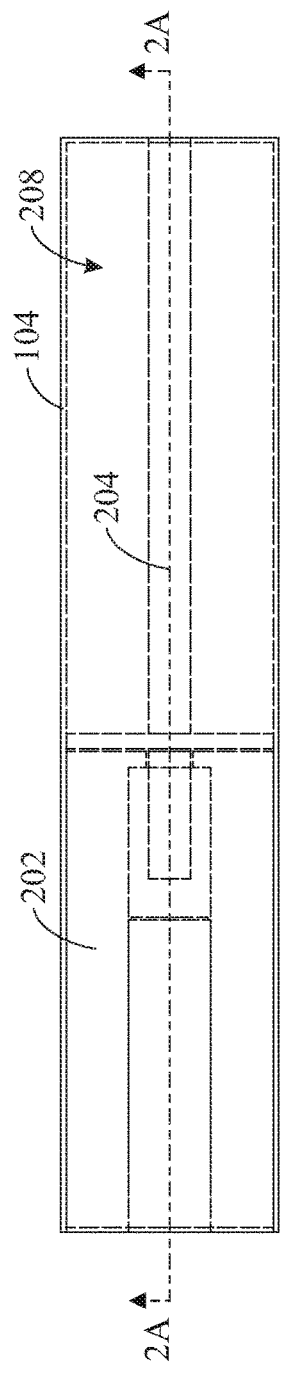
FIG. 4 shows a second exemplary cylinder occupying system, in accordance with aspects of the present disclosure.
Figure 5:
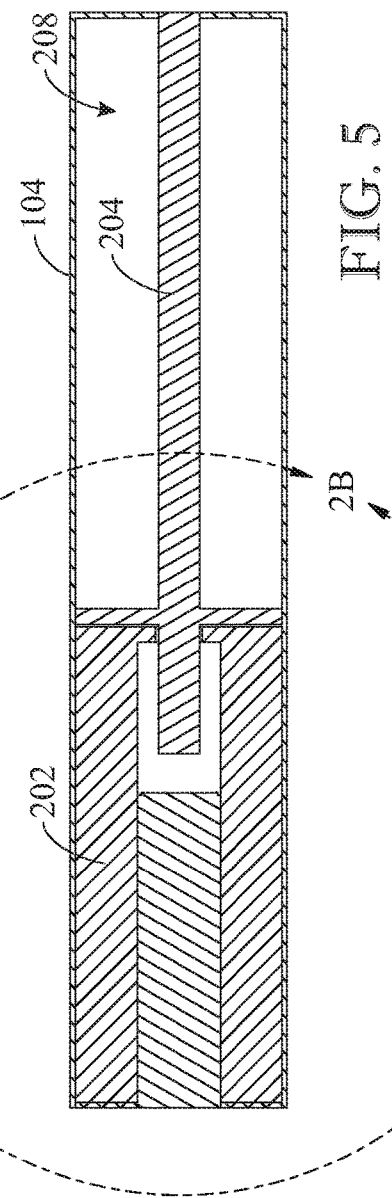
FIG. 5 shows a cross sectional view taken along plane 2A-2A in FIG. 4, in accordance with aspects of the present disclosure.
Figure 6:
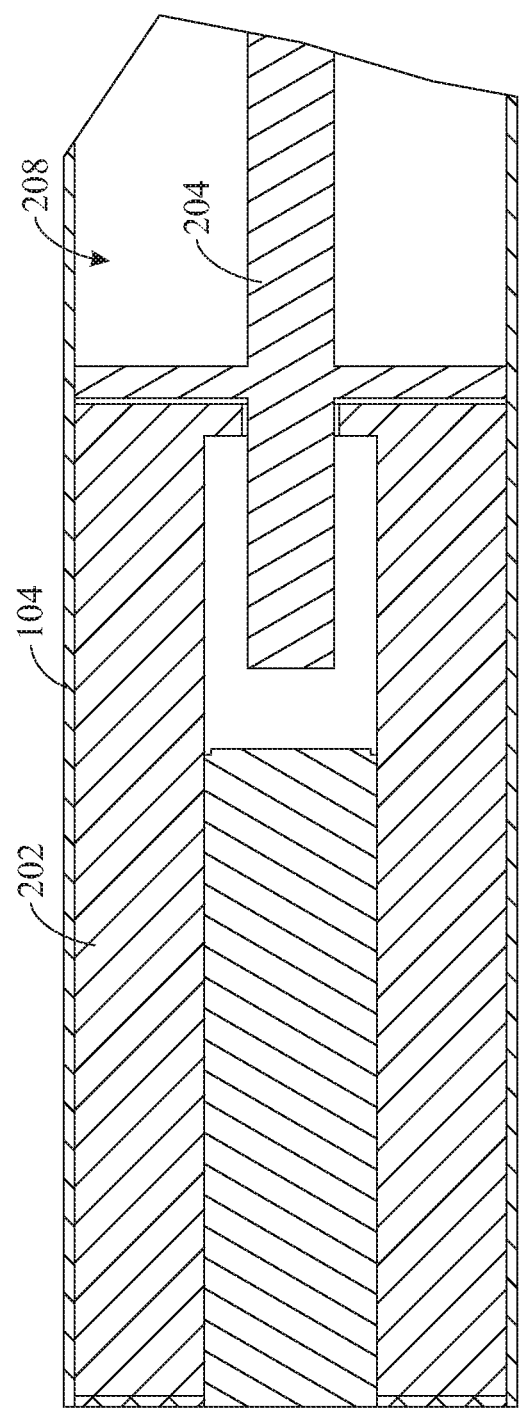
FIG. 6 shows a detail view of detail 2B of the second exemplary cylinder occupying system of FIG. 5, in accordance with aspects of the present disclosure.

The illustration of FIG. 1 presents an exemplary system that employs a cylinder-based engine 102 to produce useful work. As non-limiting examples, engine 102 may be utilized to propel a vehicle; including but not limited to seafaring vessels, wheeled vehicles, and aircraft; actuate various devices, such as hydraulic lifts, forklift arms, and backhoe arms, among other components of excavating devices and industrial machinery; and/or for any other suitable purpose. The illustration of FIG. 1 schematically shows the inclusion in engine 102 of one or more cylinders 104, with which useful work may be derived to perform such functions.

In some examples, engine 102 may be an internal combustion engine (ICE) configured produce useful work by combusting fuel in cylinder(s) 104. Cylinder(s) 104 may be arranged in any suitable configuration (e.g., I-4, V6, V8, V12), in a linear or circular arrangement. While not shown in the illustration of FIG. 1, in some examples engine 102 may be assisted by an electrical system comprising an energy source (e.g., battery) and a motor operatively coupled to one or more wheels of a vehicle in which the engine may be implemented. Such a configuration may be referred to as a "hybrid" configuration, and may employ techniques such as regenerative braking to charge the energy source.

Cylinder(s) 104 may include pistons (e.g. first and second pistons in one cylinder) that undergo reciprocating motion caused by fuel combustion therein. In some examples, the reciprocating crankshaft piston motion may be converted to rotational motion of a crankshaft, which may be coupled to one or more vehicle wheels via a transmission to thereby provide vehicle propulsion. In other examples, the reciprocating crankshaft piston motion may be converted to other components and/or other forms of motion, including but not limited to articulation of an arm of an industrial vehicle (e.g., forklift, backhoe) and linear actuation. To this end, the illustration of FIG. 1 shows an output 108 produced by engine 102, which may include the rotational motion, articulation, or actuation described above, or any other suitable output.

An intake passage may be pneumatically coupled to engine 102 to provide intake air to the engine, enabling mixing of the air with fuel to thereby form charge air for in-cylinder combustion. Intake air of fluid may be compressed in an intake space behind the occupying structure and advanced into a combustion space within the occupying structure when the occupying structure is retracted toward the intake passage. To this end, the illustration of FIG. 1 shows the reception at engine 102 of an input 106, which may comprise the fuel/air mixture. Input 106 may include any suitable combination of fuels, including but not limited to gasoline, diesel, nitrous oxide, ethanol, and natural gas. An intake throttle may be arranged in the intake passage and configured to variably control the air ingested into engine 102—e.g., as a function of mass airflow, volume, pressure. The intake passage may include various components, including but not limited to a charge air cooler, a compressor (e.g., of a turbocharger or supercharger), an intake manifold, etc. Respective intake valves may variably control the ingestion of charge air into cylinder(s) 104. A fuel system may be provided for storing and supplying the fuel(s) supplied to engine 102.

An exhaust passage may be pneumatically coupled to engine 102 to provide a path by which the products of charge air combustion are exhausted from the engine and to the surrounding environment. Various aftertreatment devices may be arranged in the exhaust passage to treat exhaust gasses, including but not limited to a NOx trap, particulate filter, catalyst, etc. For implementations in which engine 102 is boosted via a turbocharger, a turbine may be arranged in the exhaust passage to drive the turbocharger compressor. Respective exhaust valves may variably control the expulsion of exhaust gasses from cylinder(s) 104.

A controller 110 may be operatively coupled to various components in engine 102 for receiving sensor input, actuating devices, and generally effecting operation of the engine. As such, controller 110 may be referred to as an "engine control unit" (ECU). As examples, ECU may receive one or more of the following inputs: throttle position, barometric pressure, transmission operating gear, engine temperature, and engine speed. As described in further detail below, controller 110 may control the operation of a cylinder operation structure that is variably introduced into the internal space of cylinder(s) 104 in accordance with the operating cycle of the cylinder(s).

Controller 110 may be implemented in any suitable manner. As an example, controller 110 may include a logic machine and a storage machine holding machine-readable instructions executable by the logic machine to effect the approaches described herein. The logic machine may be implemented as a controller, processor, system-on-a-chip (SoC), etc. The storage machine may be implemented as read-only memory (ROM, such as electronically-erasable-programmable ROM), and may comprise random-access memory (RAM). Controller 110 may include an input/output (I/O) interface for receiving inputs and issuing outputs (e.g., control signals for actuating components).

Engine 102 may assume other forms. For example, engine 102 may be configured for hydraulic operation, where cylinder(s) 104 include respective crankshaft pistons that undergo reciprocating motion to variably compress a hydraulic fluid therein. In this example, input 106 may include a hydraulic fluid that is supplied to cylinder(s) 104, such as oil, water, and/or any other suitable fluid(s). Output 108 may include rotational motion, articulation, actuation, or any other suitable type of mechanical output. Alternatively or in addition to mechanical output, output 108 may be considered to include hydraulic fluid that is pressurized by cylinder(s) 104, where the pressure applied by the cylinders may be transmitted to hydraulic fluid in other components that are in at least partial fluidic communication with the cylinders. Such hydraulic output may in turn be utilized to generate mechanical output, as in a hydraulic lift, for example. For implementations in which engine 102 is configured for hydraulic operation, the engine, and/or other elements that may form a hydraulic circuit, may include any suitable combination of hydraulic components, including but not limited to a pump, valve, accumulator, reservoir, filter, etc. In such implementations, controller 110 may be configured to control the operation of hydraulic cylinder(s) 104, engine 102, and/or other components of a hydraulic circuit, based on any suitable sensor output(s) (e.g., pressure, valve state, flow rate).

To increase cylinder output and avoid the drawbacks described above associated with existing approaches to increasing cylinder output, cylinder(s) 104 include a cylinder occupying structure 202 (i.e. insertion rod) that is variably inserted in, and removed from, the internal space of the cylinder(s) in which the operative fluid(s) (e.g., hydraulic fluid, combustible fuel) used to produce output are introduced. The figures show exemplary implementations of the cylinder occupying structure for a combustion cylinder, where the occupying structure configured to be subjected to a retracting and/or advancing force toward a combustion space, and/or toward a crankshaft piston (e.g. downward in FIG. 7) by an electromagnetic actuator, hydraulic charger, turbo charger, or the like.

The figures show cylinder 104 including a cylinder occupying structure 202, also referred to herein as an insertion rod or second piston. The cylinder occupying structure 202 acts as a second piston in addition to crankshaft piston 204 (e.g. the crankshaft piston 204 is a first piston), and the occupying structure 202 partially surrounds a combustion chamber.

Crankshaft piston 204 is coupled to a connecting rod, which may be coupled to another device such as a crankshaft to thereby translate reciprocating motion of the crankshaft piston to rotational crankshaft motion or another form of motion, which in turn may be used to propel a vehicle, actuate a device, etc. Reciprocating motion of crankshaft piston 204 may be caused by charge air combustion in an internal space 208 of cylinder 104. Combustion may be controlled in part by an intake valve 210 actuated via an intake camshaft, which is operable to selectively inject charge air into internal space 208 for compression and ignition therein. A spark or glow plug may be controlled to cause ignition of injected charge air. Combustion products may be exhausted via an exhaust valve 216 actuated via an exhaust camshaft. To draw heat away from cylinder 104 in the course of charge air combustion, and thereby maintain desired operating temperatures and avoid thermal degradation, a coolant jacket may be arranged between the inner cylinder wall that defines internal space 208 and the outer cylinder wall that defines the exterior of the cylinder. A suitable coolant, which may comprise any suitable substance (s) such as water, antifreeze, etc., may be circulated through coolant jacket via a cooling system. The cooling system may include a radiator that radiates heated coolant to an exterior environment, for example.

As described above, cylinder 104 includes a cylinder occupying structure 202 that is variably inserted into internal space 208 to increase cylinder output and efficiency. In particular, structure 202 is an insertion rod that is variably inserted into internal space 208 in correspondence with the reciprocating movement of crankshaft piston 204. In some examples, insertion rod 202 may be progressively inserted into internal space 208 as crankshaft piston 204 moves downward (with respect to FIG. 7 for example) through the internal space. The insertion rod (i.e. occupying structure) may have a fluid accumulation space, or compartment, behind it near an intake side (upper side, FIG. 7), and is configured to have four stroke functions performed in two crank shaft piston motions. However, cylinder 104 may be configured according to any suitable operating cycle, based on which the introduction of insertion rod 202 into internal space 208 may be controlled. Generally, insertion rod 202 may be inserted into internal space 208 as crankshaft piston 204 moves downward (with respect to FIG. 7).

Cylinder 104 may execute a compression stroke (e.g., for a two or four-stroke operating cycle) or exhaust stroke (e.g., for a four-stroke operating cycle). The insertion rod 202 may be variably inserted in and removed from internal space 208 in correspondence with movement of crankshaft piston 204 downward and upward (with respect to FIG. 7), respectively. The correspondence between movement of insertion rod 202 and crankshaft piston 204 may assume any suitable form. In some examples, the movement of insertion rod 202 and crankshaft piston 204 may be substantially synchronized, such that the insertion rod is actuated at substantially the same rate and direction as the crankshaft piston. As crankshaft piston 204 changes direction—i.e., stops moving upward or downward, and begins moving downward or upward, respectively—so too may insertion rod 202 accordingly change direction.

By placing insertion rod 202 in cylinder 104 during operating cycle portions in which a working fluid (e.g., hydraulic fluid, combustible fuel) is introduced into internal space 208, or an accumulation compartment or space behind the occupying structure toward an intake side, the volume of the internal space available to be occupied by the fluid is reduced by its partial occupancy by the insertion rod. The intrinsic volume of internal space 208 and cylinder 104 remains unchanged, however. In this way, the fluid mass introduced into cylinder 104 is reduced, without changing other cylinder parameters that affect cylinder output, such as stroke volume, stroke distance, stroke force, and crankshaft piston surface area. Put another way, insertion rod 202 enables a reduction in the intake requirement of cylinder 104, and, as a result of its occupancy of internal space 208, the insertion rod further causes the volume of the internal space that is utilized in a combustion or hydraulic process—the so-called "combustion volume" or "hydraulic volume"—to be less than the intrinsic volume of the internal space itself. The intrinsic volume of cylinder 104 may be considered the volume defined by the inner walls of the cylinder, and in some contexts the volume above the upper surface of crankshaft piston 204.

An electromagnetic system may add retracting or advancing forces to the occupying structure 202. In this implementation, insertion rod 202 is variably removed from internal space 208 during an expansion stroke via a solenoid-type electromagnetic actuator comprising a coil 224 that is coupled at top and bottom ends to an electrical system 226. An electromagnetic core may be dedicated to applying a retraction force to the occupying structure (e.g. a force toward the intake side, or in other words a force away from the combustion space, upward in FIG. 7).

An electromagnet may be dedicated for either repelling or attracting the occupying structure, depending on a specific application. Whichever (repelling or attracting) the electromagnet is dedicated to, the remaining function (e.g. repelling or attracting) may be passive in functionality. The electromagnetic force may be used to retract the occupying structure in an early stage of an expansion stroke for the purpose of responding to an engine, vehicle, or throttle slow down command, to avoid having to release exhaust early. In this implementation, insertion rod 202 includes a magnet 227 (e.g., a permanent magnet) to enable interaction with magnetic fields generated by electrical currents transmitted through coil 224, and the solenoid-type electromagnetic extension and retraction of the insertion rod. Magnetic force lines produced by coil 224—specifically the portions thereof within the internal space of the coil below the upper end of the coil and above the lower end of the coil—may be substantially parallel with the direction in which insertion rod 202 extends and retracts. To facilitate the electromagnetic actuation of insertion rod 202 described herein, electrical system 226 may include a current source with which current is selectively provided to coil 224. Electrical system 226 is operatively coupled to a controller 110, which may control the electrical system to selectively position insertion rod 202, and/or provide retracting or advancing forces to the occupying structure 202, in accordance with the operating cycle of cylinder 104 as described above, and/or based on any other suitable inputs (e.g., camshaft timing, valve timing, intake or charge air variables, other operating conditions). In some examples, controller 110 may be controller 110 of FIG. 1, but may also include various devices and systems to subject the occupying structure 202 to retracting or advancing forces, or to add pressure to an upper side (e.g. intake side of FIG. 7) of the occupying structure 202. Such devices and systems of the controller 110 may be hydraulic or turbo chargers, electromagnetic actuators, or any appropriate system that can control forces that the occupying structure 202 is subjected to, generally referred to herein as "force application mechanisms". One or more of coil 224, electrical system 226, magnet 227, and controller 110 may form what is referred to herein as an "electromagnetic actuator". In some examples, the electromagnetic actuator may be considered a solenoid, where insertion rod 202 acts as a slug translated by the electromagnetic actuator. It is to be understood that, as shown in FIG. 7, the retraction and advancing forces are applied to the body of insertion rod 202.

Other electromagnetic configurations for actuating insertion rod 202 are contemplated. For example, cylinder occupying structure 202 may be configured with an electromagnetic actuator without a permanent magnet included in insertion rod 202, where electrical current is selectively applied to the electromagnetic actuator to variably generate a magnetic field. Electromagnetic force may be fed by recovering wasted energy from the system. Generally, any suitable electromagnetic mechanism may be used to actuate insertion rod 202.

Cylinder 104 may be configured with other aspects that increase cylinder output, such as configuring the occupying structure and/or the crankshaft piston to have a cone shape or profile at their distal ends. For example, a distal end may be an end that is facing toward a combustion space.

An internal surface of the crankshaft piston may include dents and/or protrusions to increase the shear stress forces during a relative motion of the crankshaft piston. Further, the internal surface of the crankshaft piston may include a second lighter density metal to increase a distance between the gravity or weight center and the geometric center of the crankshaft piston, providing partial advantage in the stroke distance relative to the cylinder internal space volume.

Coil 224 may be arranged in a housing, which interfaces with an insulation barrier that enables low-friction movement of insertion rod 202 and substantial sealing between internal space 208 and the housing. Coil 224 is electrically driven by an electrical system 226, which is coupled to a controller 110.

A magnet 407 (FIG. 17) creates a magnetic field between a positively charged portion of the insertion rod 202 and the magnet 407. The magnetic field is shown via magnetic force lines. It is to be understood that the mechanical movement of the insertion rod is parallel with the magnetic force lines shown in FIG. 17. Therefore, a movement vector of the insertion rod 202 would not cross the magnetic force lines. The coil 224 provides another magnetic field responsible for controlling the reciprocal movement controls, while the coil or magnet 407 provides a field responsible for providing a driving force of the insertion rod 202. Therefore, in addition to the magnetic field provided by a solenoid, the system would also need to control the frequency of insertion rod movement, and the advancing force or the motion of the insertion rod may be gained from another field provided by magnet 407.

In one example, a spring may be coupled to the insertion rod 202 that is variably introduced into and retracted from an internal space 208 of cylinder 104 for the purpose to prevent an early retraction of the insertion rod during the expansion stroke.

The occupying structure 202 may be made of any one or more parts or cylindrical layers. The occupying structure may be of different sizes in different engine cylinders. For example, some occupying structure 202 shapes may be designed for higher torque requirements, as a non-limiting example. Unlike for the crankshaft piston, cooling an occupying structure can be challenging, however, a solution can be implemented using a solid body of higher heat bearing material, or using an empty core filled with a gas like helium, and interfaced with a cooling jacket in the cylinder. Furthermore, the contact between the occupying structure and the internal surface of cylinder can be though bearing rings before and after the cooling jacket or such that compressed air is allowed to pass from the compression compartment to fill in the tiny space between cylinder and occupying structure to minimize friction.

The cylinder occupying structure 202 and cylinder implementations described herein are provided as examples and are not intended to be limiting in any way. Numerous modifications are within the scope of this disclosure. "Cylinder" as used herein does not require cylindrical geometry, but rather refers to a mechanical device in which reciprocating crankshaft piston motion is used to produce useful work and output. Non-spherical geometries, such as hemispherical or wedged geometries may be employed, for example. Various cylinder components may be added, removed, or modified, including cylinder head components, valves, etc. Further, alternative insertion rod configurations are contemplated. For example, the insertion rods disclosed herein may enter a cylinder internal space from the bottom, side, or from any other direction, including at oblique angles. The cylinder 104 may itself have a curved shape as part of a circular shape engine with the piston and insertion rod following a circular or curved path during a stroke motion. Still further, implementations are possible in which both spring-based and electromagnetic actuation is employed to control an insertion rod. In some hydraulic implementations, a hybrid solution may be employed in which fluid is mechanically pumped as well as magnetically advanced against a crankshaft piston. For example, fluid may be pressed against a crankshaft piston plunger without using a hydraulic pump during an active press. For example having a second adjacent cylinder, not equipped by the occupying structure, dedicated to compressing air, and could act as a hydraulic cylinder for using its compressed air into the compression space of the first cylinder to increase its effective compression ratio or to cause an advancing force to the occupying structure. The first cylinder, equipped with the occupying structure can also use hydraulic fluid between occupying structure and crankshaft piston as a hydraulic mechanism instead of a combustion engine.

The cylinder occupying structure implementations described herein may produce various technical effects and advantages. For example, the cylinder occupying structure may reduce the required fluid intake (e.g., fluid mass, fluid volume) into a cylinder (e.g., the required intake to perform a given stroke or travel a given stroke distance), where the required fluid intake is, in some contexts, initially stipulated by crankshaft piston movement and shape. A reduced fluid intake may be used to maintain a similar stroke force relative to that associated with an initially larger fluid intake. In other examples, the cylinder occupying structure may allow using a similar fluid volume for a larger distance stroke. Further, the cylinder occupying structure may enable the application of a larger force per square inch on a crankshaft piston's internal surface. In some examples, one or more insertion rods may add to a crankshaft piston's effective surface area to increase force and power output. In some examples, such as those that employ electromagnetic actuation, the cylinder occupying structure may maintain combustion pressure magnitude, by holding an insertion rod steadily in place, with a magnetic field being initiated with fuel combustion. In some examples, the cylinder occupying structure may enable increases in stroke distance and crankshaft piston momentum via progressive rod insertion into a cylinder internal space. In some examples, the cylinder occupying structure may facilitate laminar crankshaft piston movement with a slower pressure decline. In some examples, the cylinder occupying structure may enable an increase in power input magnitude from a static electric or static magnetic force. In some examples, the cylinder occupying structure may undergo motion parallel to magnetic force lines, without consuming electric power as long as an insertion rod does not cross the magnetic force lines. In some examples, such as those that employ mechanical spring-based actuation, the cylinder occupying structure may enable increased stroke distance, increased momentum, more laminar crankshaft piston movement with decreased pressure variations, an increase of power input from insertion rod inertia and spring expansion momentum. In hydraulic implementations, an insertion rod may reduce the pressurized hydraulic fluid intake from a pump, as the fluid moved against a crankshaft piston plunger is larger in calculated mass than the pumped fluid. These and other technical effects may increase the economy of a vehicle in which the cylinder occupying structure is implemented.

The herein described steps, tasks, and methods may be repeated throughout operation of the cylinder, at any suitable frequency, interval, duty cycle, etc., which may include continuous operation or may be interrupted (e.g., in response to controller input, operator input).

The insertion rod 202 and the crankshaft piston 204 may have a cone shape at surfaces where they interface. The insertion rod 202 may partially contain and/or partially surround the combustion space. The insertion rod 202 may be mechanically connected to an electromagnetic actuator or other force application mechanism controlled by the controller 110. The cone shape of the internal surface of the crankshaft piston 204 provides better performance in torque and speed, when compared with ordinary shaped cylindrical bodies commonly used.

The disclosed cylinder system may employ a cylinder-based engine 102 to produce useful work. Combustion space 208 may be surrounded by parts of the insertion rod and the crankshaft piston, making the combustion compartment itself relatively move or change in shape and size within the cylinder with respect to the cylinder.

Dedicating an electromagnet to act only with a repelling task, or only with an attraction task, the magnetic core would then keep its poles orientation unchanged and its electrons gathering would stay on one side all the time. If such arrangement is adopted, then it is expected that the magnetic field strength added to a solenoid component could be hundreds of times in force magnitude greater than the field created by the current and voltage of a comparable alternating poles magnet and such enhancement can reflect tremendous benefits on energy recovery gained from the properties of a permanent magnet that is not alternating poles. This would be of great benefit to the overall engine energy return.

The occupying structure (i.e. insertion rod) may act as a second moving piston within the cylinder. A solution for decreasing the cylinder internal pressure would be moving the second piston in an opposite direction (e.g. away from) the crank shaft linked piston instead of releasing unburned exhaust, by using a secondary force from an electromagnet or other force source. Timing such an arrangement is easier when the insertion rod partially surrounds the combustion space and becomes a participant part of the initial acceleration as a second piston, with surface special shaping, making the insertion rod change direction when subjected to pressure from the front side, which will bring such insertion rod to stop during the expansion stroke and slowly start reversing direction. Controlling its position may be done using secondary supporting devices like an electromagnetic motor for stronger retraction or a turbo charger or hydraulic charger for stronger and longer advancement.

Having a second piston (insertion body or occupying structure) positioned between intake pathways and a combustion space, along with continuously maintaining higher fluid pressure at the intake side than exhaust side of the occupying structure during retraction of a crankshaft driving piston helps keep intake pathways cleaner and more reliable for a long time.

When the insertion rod surrounds the combustion chamber it advances as part of the initial acceleration as a second piston, the insertion rod may change direction when subjected to pressure from the crankshaft side after the two pistons disengage, making the insertion rod stop during the expansions stroke and slowly start reversing direction.

It is to be understood that the phrase "moving in a direction of the crankshaft piston" may refer to a direction pointing to a location of the crankshaft piston, rather than a direction of movement of the crankshaft piston.

The system provides the herein disclosed benefits because energy applied to move a similar load to a similar distance using a same route allows energy expenditure to be time independent, meaning if displacement happens slow or fast, a same energy value may be used to perform work. The fluid accumulation compartment behind the occupying structure allows four strokes performed in two crankshaft motions. The system provides not only energy saving configurations but also an alternative way to manage engine acceleration and deceleration with decreased pollution emissions.

To execute four strokes in two crankshaft piston motions, fresh air or premix fluid is initially introduced behind the space occupying structure during an expansion stroke in a port injection chamber to add driving force to the expansion stroke and also (as part of the compression stage) to partly compress the air. When the compression stroke starts, this partly compressed fluid will move into the combustion space as an indirect injection method with further compression (e.g. complete compression) through the communication channel installed behind the space occupier. In another method (direct injection) a special channel may reach directly along with a spark plug to the combustion chamber. An exhaust outlet 216 may have various positions and configurations. It is to be understood that the definition of "premix" fluid may be port injection fluid or indirect injection fluid, and a "premix chamber" may be a port chamber.

In other words, fresh air fluid is initially introduced behind the space occupier during the expansion stroke in a port injection chamber 201 (FIG. 3) using a turbo charger or supercharger to add driving force to the space occupier and also as part of compression stage to partly compress the air in one or more compartments. When the compression stroke starts and pistons start to retract, this partly compressed air will move to the combustion space with further compression through the inlet valve position 203 so that it drives exhaust fluid away to area between the two pistons, toward exhaust valve, and by the time the pistons start to engage, the combustion space is clean from exhaust, then fuel fluid will be completely or partly injected into one of the port injection chambers to mix with the fresh air, and with complete piston retraction, the air-fuel mix will move to the combustion chamber as an indirect injection method. In another method direct injection through special channel or path fuel may reach directly along with spark plug to the combustion chamber, through a center or side space in or near the space occupier and fuel injection will apply to the combustion space rather than the port-injection chamber. Exhaust outlet 216 may have different positions however it may align with the area between the two pistons as the start to engage during the compression stroke. A spark plug may also be used in non-diesel fuel with direct or indirect injection.

The illustrations of FIGS. 2-18 will now be described in more detail below.

Shown in FIGS. 2-18 are various examples, components, and features that may be included in a cylinder occupying system. For example, the cylinder 104 may include an internal space 208, an occupying structure 202, and a crankshaft piston 204. The internal space 208 of the cylinder 104 is modified by the occupying structure 202 such that combustion pressure applied to the crankshaft piston 204 is applied to a smaller surface area of the crankshaft piston 204 during an early part of an expansion stroke and to a larger surface area of the crankshaft piston 204 during a later part of the expansion stroke.

Figure 8:
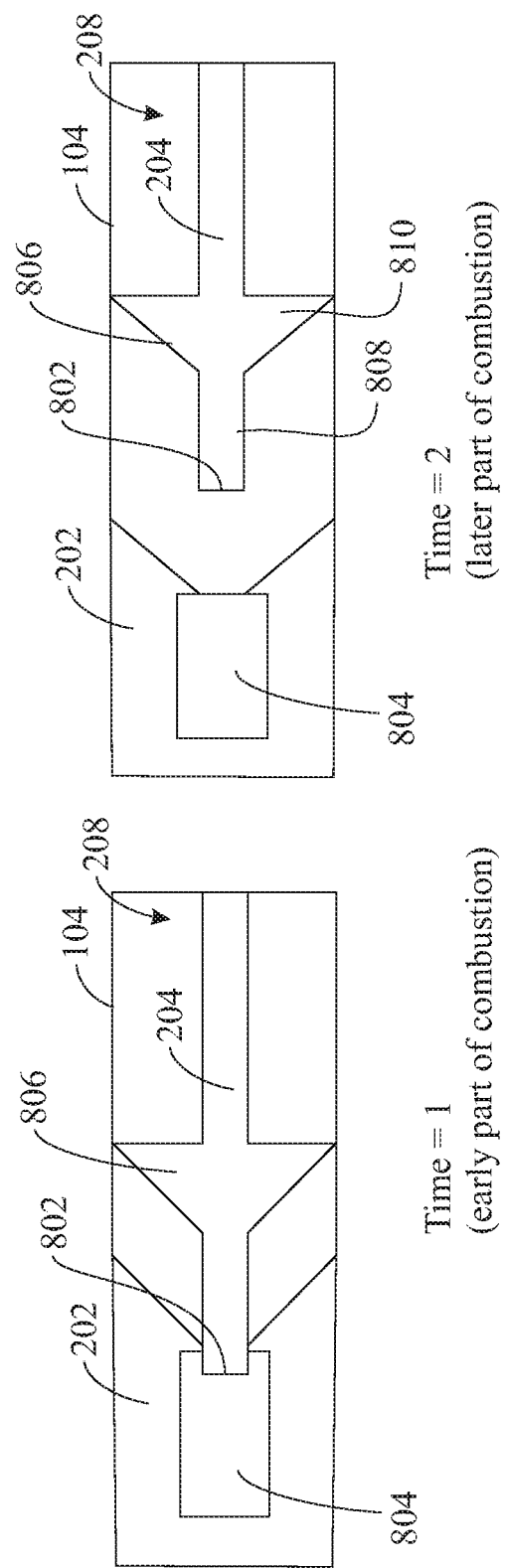
FIG. 8 schematically shows how a crankshaft piston moves during an expansion stroke, in accordance with aspects of the present disclosure.
Figure 9:
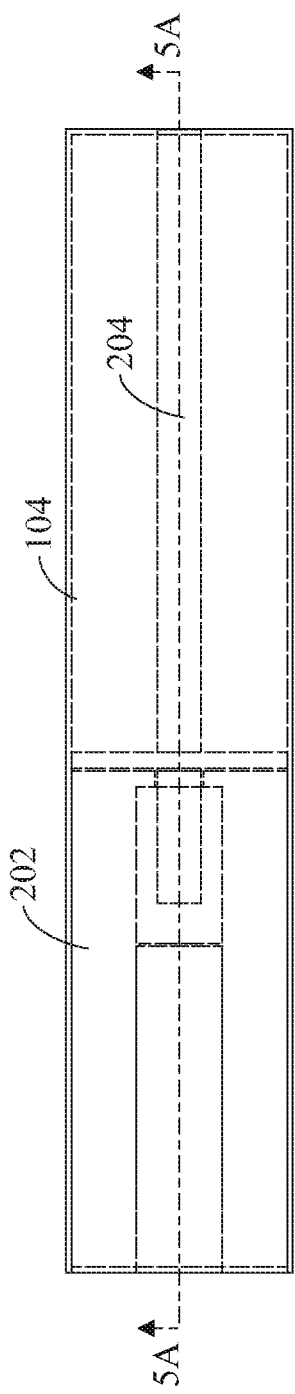
FIG. 9 shows a third example of a cylinder occupying system, in accordance with aspects of the present disclosure.
Figure 10:
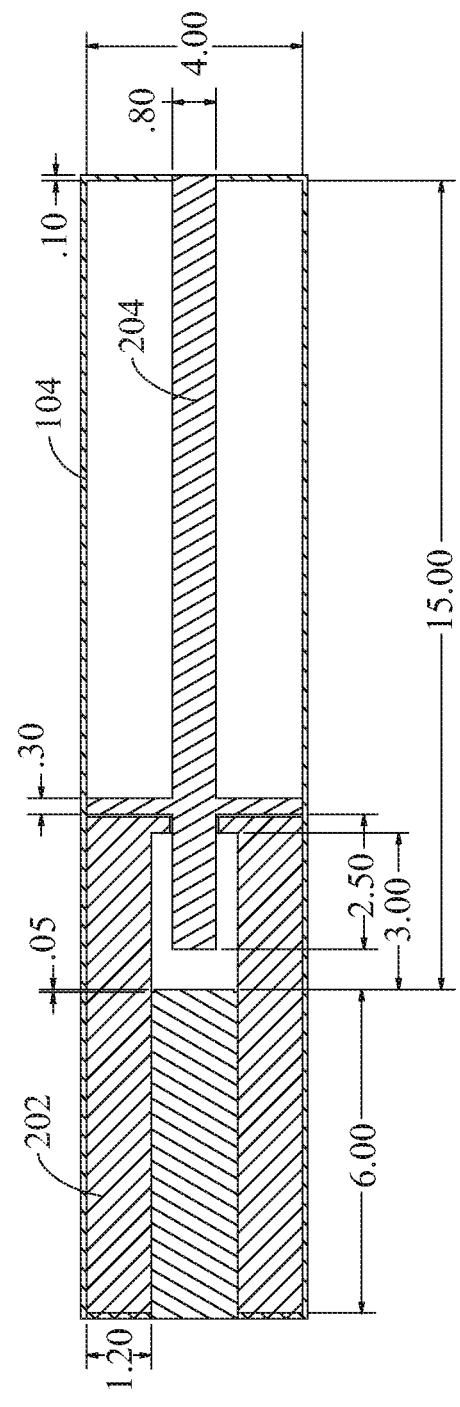
FIG. 10 shows a cross sectional view of cross section 5A-5A of FIG. 9, in accordance with aspects of the present disclosure.
Figure 11:
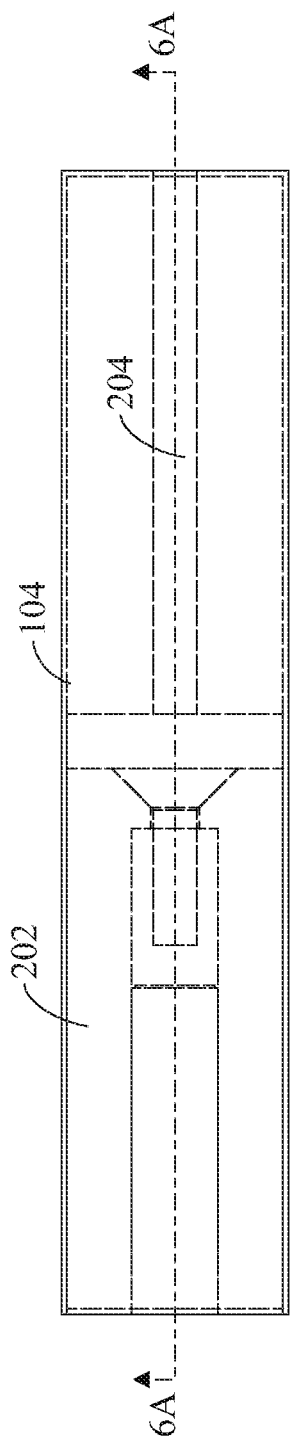
FIG. 11 shows a fourth example of a cylinder occupying system, in accordance with aspects of the present disclosure.
Figure 12:
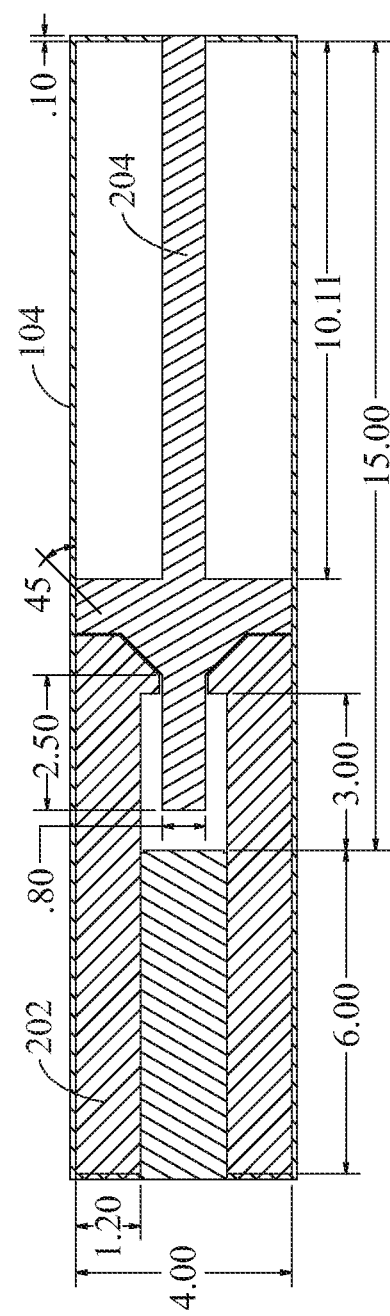
FIG. 12 shows a cross sectional view of cross section 6A-6A of FIG. 11, in accordance with aspects of the present disclosure.
Figure 13:
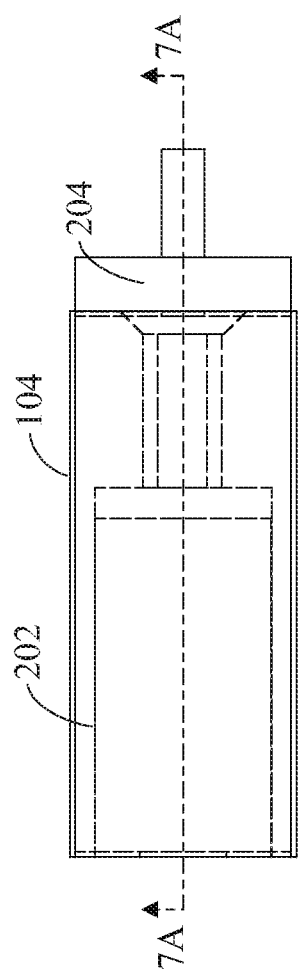
FIG. 13 shows a fifth example of a cylinder occupying system, in accordance with aspects of the present disclosure.
Figure 14:
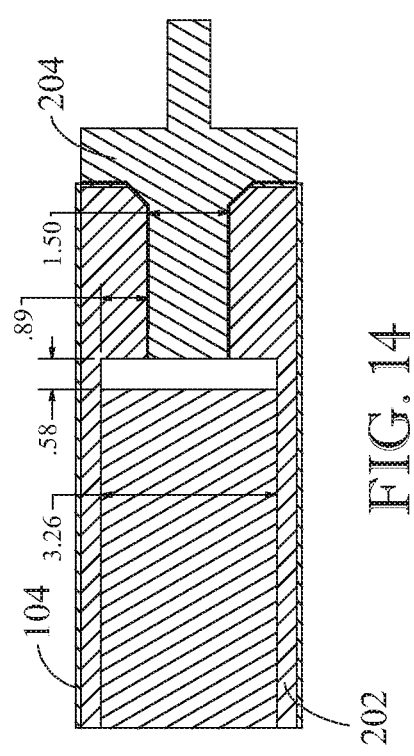
FIG. 14 shows a cross sectional view of cross section 7A-7A of FIG. 13, in accordance with aspects of the present disclosure.
Figure 15:
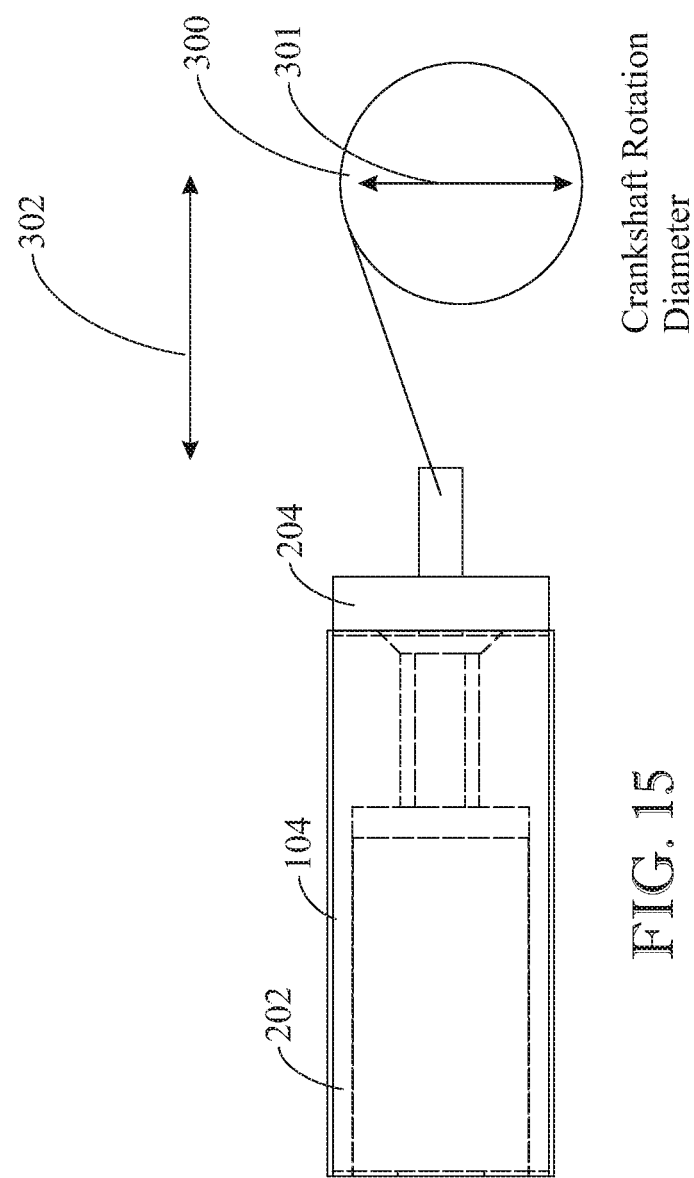
FIG. 15 shows an indication of a crankshaft rotation diameter, in accordance with aspects of the present disclosure.
Figure 16:
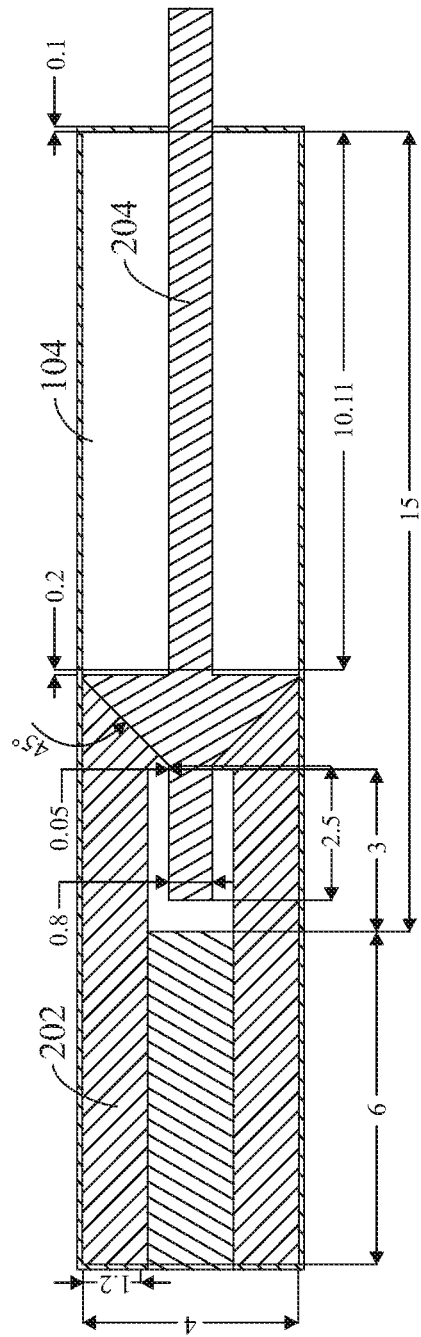
FIG. 16 schematically shows a cross sectional view of a sixth example of a cylinder occupying system, where the cross section is taken longitudinally along a cylinder, in accordance with aspects of the present disclosure.
Figure 17:
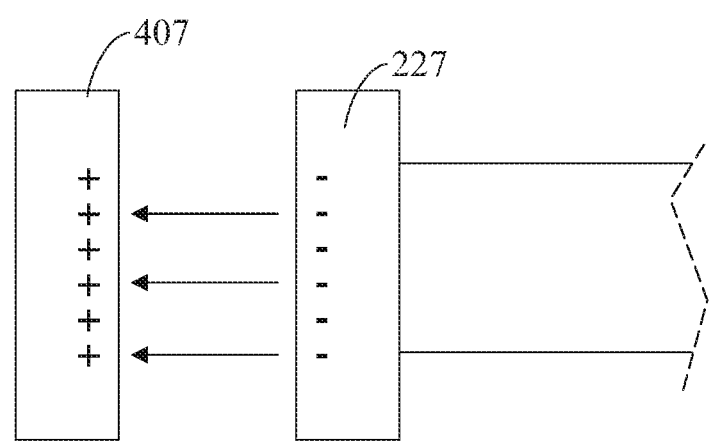
FIGS. 17 and 18 schematically show a magnetic arrangement for attracting or repelling a cylinder occupying structure, in accordance with aspects of the present disclosure.
Figure 17:
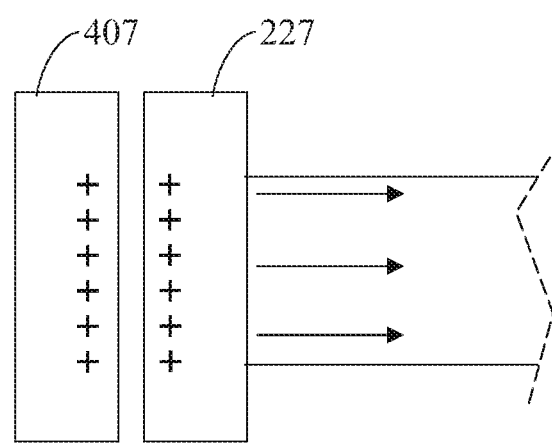

For example, as seen in FIG. 8, on the left, a smaller surface area 802 is exposed to combustion in a combustion cavity 804 in an early point in time of an expansion stroke. And on the right, a later point in time of an expansion stroke is shown, where a larger surface area 806 is exposed to combustion that originated in the combustion cavity 804. This concept is applied to all examples shown in the figures. The partial cone shape or profile of the crankshaft piston provides a grater surface area exposed to the advancing combustion pressure wave compared to a right-angle profile, due to the geometry of angled surfaces relative to cylinder walls. However, even the right-angled profile crankshaft pistons shown in FIGS. 4, 5, 6, and 10 benefit from the changes of combustion surface area exposed to the crankshaft pistons at early and later times during a combustion stroke.

For example, the crankshaft piston may include an end portion that changes from a thinner dimension 808 to a thicker dimension 810, such that the thinner dimension portion is what is exposed to the combustion pressure early, and the thicker portion is exposed to the combustion pressure later, as shown in FIG. 8. The thinner portion may be inserted into the combustion space, or alternatively placed right next to an end of the combustion space at the moment of combustion. The profile of the occupying structure may exactly, match, be congruent to, or generally match, that of the crankshaft piston. The thinner portion may be distally located (e.g. toward the left in FIG. 8) with respect to the thicker portion.

The system may be configured such that combustion occurs within a cavity 804 of the occupying structure 202 to apply combustion pressure to both the occupying structure 202 and the crankshaft piston 204.

The occupying structure 202 may be a movable structure relative to the cylinder 104. Movement of the occupying structure 202 may be controlled by one or more forces applied by a force application mechanism 702. The occupying structure 202 may change direction during the expansion stroke.

The force application mechanism 702 may be responsive to throttle position (e.g. of a vehicle) by way of throttle position sensors such that one or more forces applied to the occupying structure 202 are dependent on throttle position. The force application mechanism 702 may be configured to apply a retracting force to the occupying structure 202 during the expansion stroke. The force application mechanism 702 may be configured to apply an advancing force to the occupying structure during the expansion stroke.

The force application mechanism 702 may include an electromagnetic actuator, a hydraulic system, and/or a forced induction system. Examples of forced induction systems are turbo chargers, hydraulic chargers, and super chargers. The occupying structure may be mechanically coupled to the electromagnetic actuator.

Figure 18:
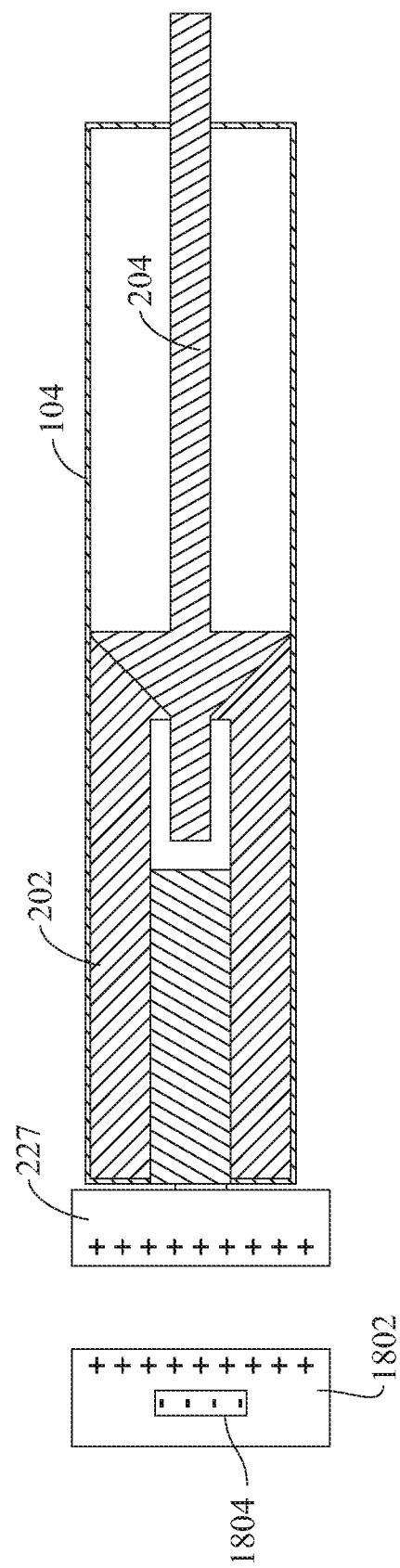

The illustration of FIG. 18 shows a first electromagnet 1802 that may be activated during crankshaft piston expansion providing a repelling action (advancing force). A second electromagnet 1804 may be activated during crankshaft piston retraction, providing an attracting action (retracting force).

The system may be configured to partially execute a compression stroke, by compressing fluid at the intake side, during the expansion stroke which also means applying a force to the occupying structure 202 via the force application mechanism 702. As such, the system may be configured to perform intake, compression, expansion, and exhaust functions within two strokes per combustion.

The system may be configured to deliver fluid to an intake side 704 of the occupying structure 202 to increase cylinder pressure and engine acceleration. The system may be configured to cause engine deceleration by applying a retracting force to the occupying structure 202. The system may be configured to cause engine acceleration by applying an advancing force to the occupying structure 202. Further, as shown in FIG. 7, a fluid channel 706 allows fluid to travel from the intake side 704 to the combustion chamber 804.

The fluid channel 706, also referable as a communication channel, may have a control valve to separate the timing between: stage 1 and stage 2 of fluid management. Stage 1 includes fluid accumulation behind the space occupier (insertion body) during the expansion stroke which partly compresses fresh air using a turbo or super charger, applying secondary driving forces to the pistons, or premix fluid while applying driving force to pistons. Stage 2 includes transferring partly compressed fresh air or premixed fluid to the combustion space within the space occupier through a communication channel which may contain multiple valves and pathways. The communication channel, or channels, may include a path to fresh air entry and another path to an exhaust outlet. Using a space occupying structure, the exhaust pathways may fit through the communication channel, where the communication channel may be equipped with multiple pathways and connections to fresh air entry or premix fluid entry as well as to the exhaust pathway.

The communication channel may have a one way valve, and the valve may open to allow partially compressed fluid to move to combustion space, and the valve may close during expansion stroke. A port injection compartment may expand in size during an expansion stroke.

The system may be configured to, due to combustion pressure between the crankshaft piston 204 and the occupying structure 202, allow the occupying structure 202 to accelerate in a retracting direction away from the crankshaft piston 204 to absorb part of combustion forces that would otherwise be applied to the crankshaft piston 204. The system may be configured to perform intake, compression, expansion, and exhaust functions within two strokes per combustion.

Figure 19:
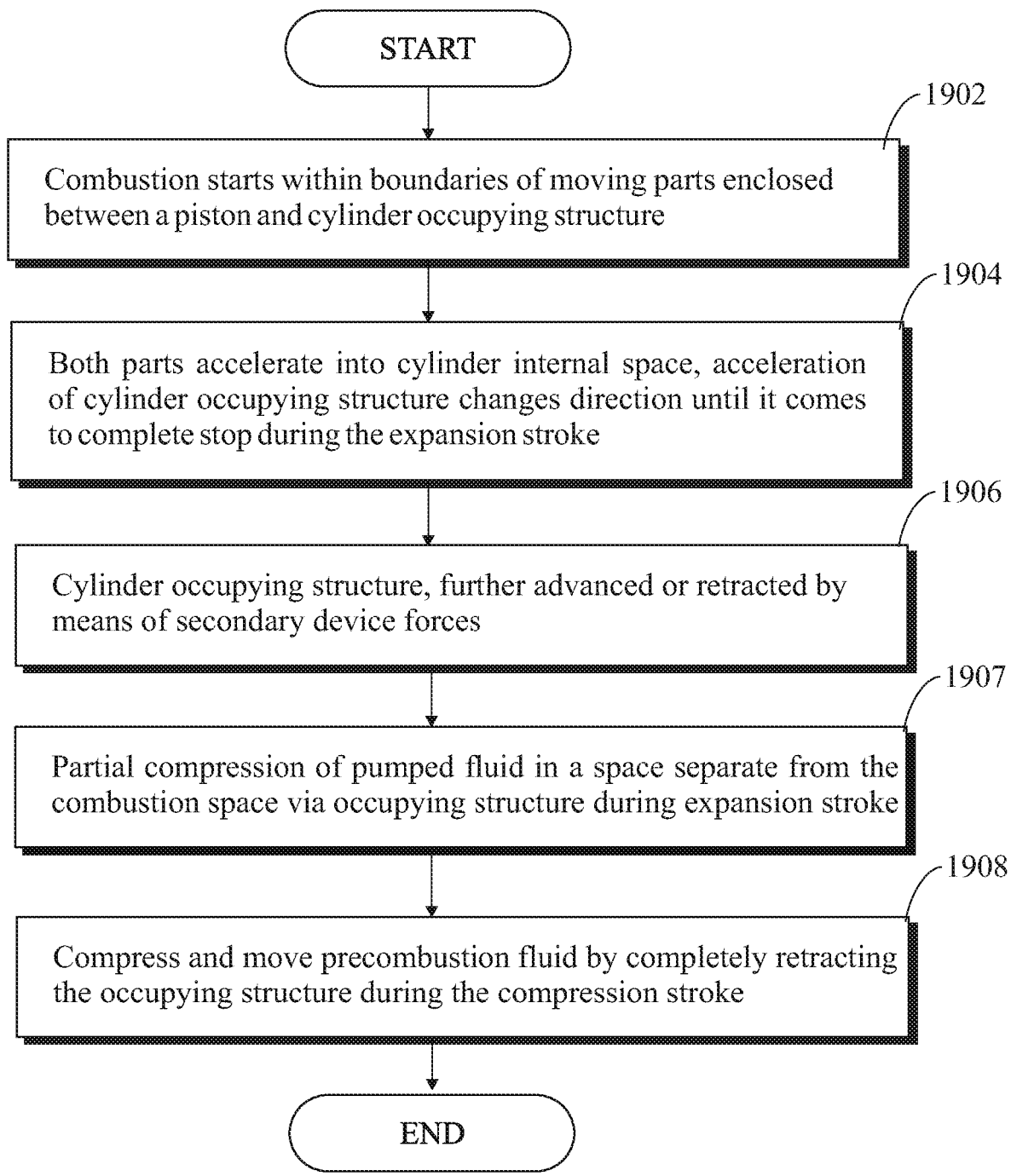
FIG. 19 schematically shows a cylinder occupying method using any of the disclosed cylinder occupying structures, in accordance with aspects of the present disclosure.
Figure 36:
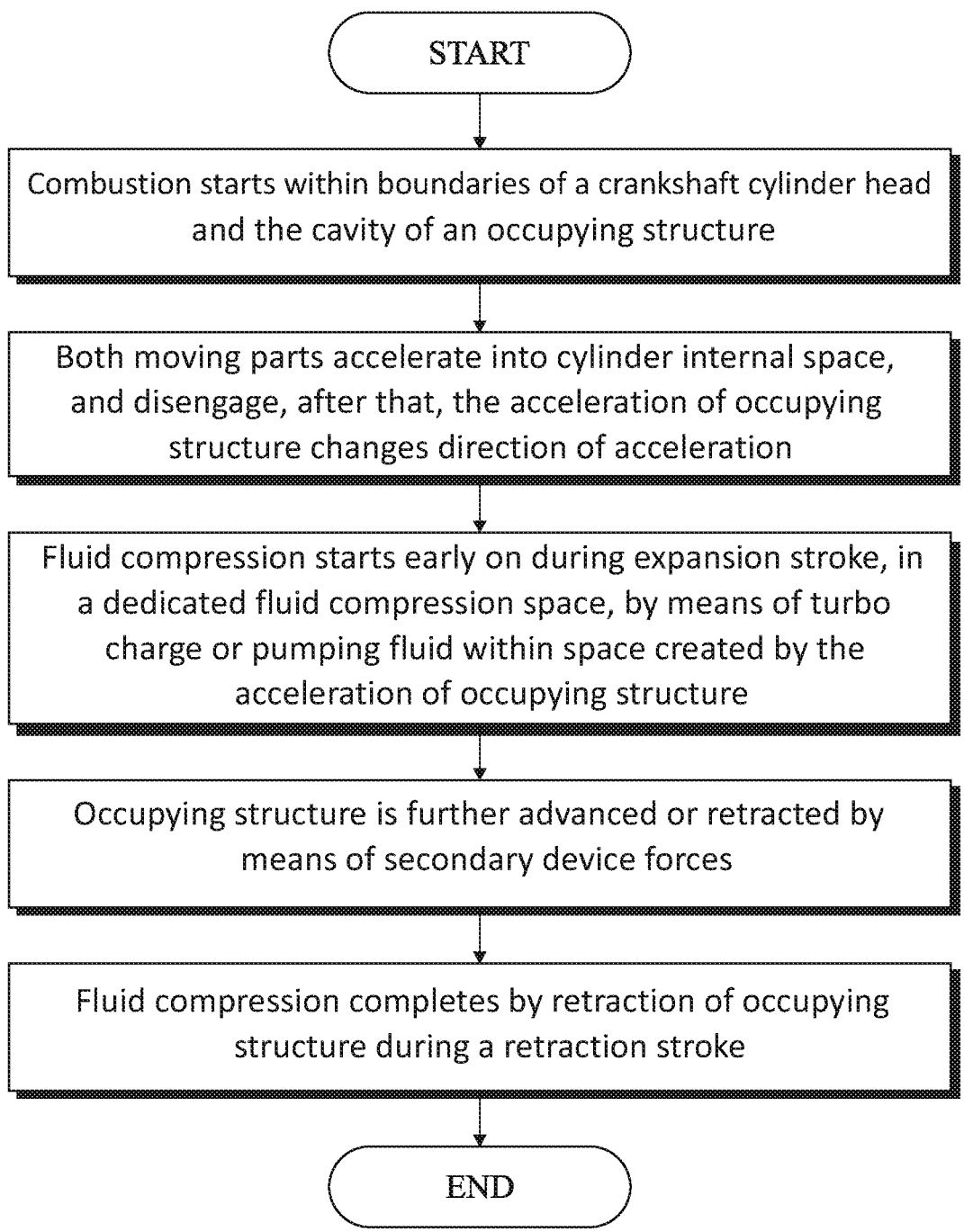
FIG. 36 shows a flowchart of a method for compressing fluid by retracting the occupying structure during a retraction stroke.
Figure 37:
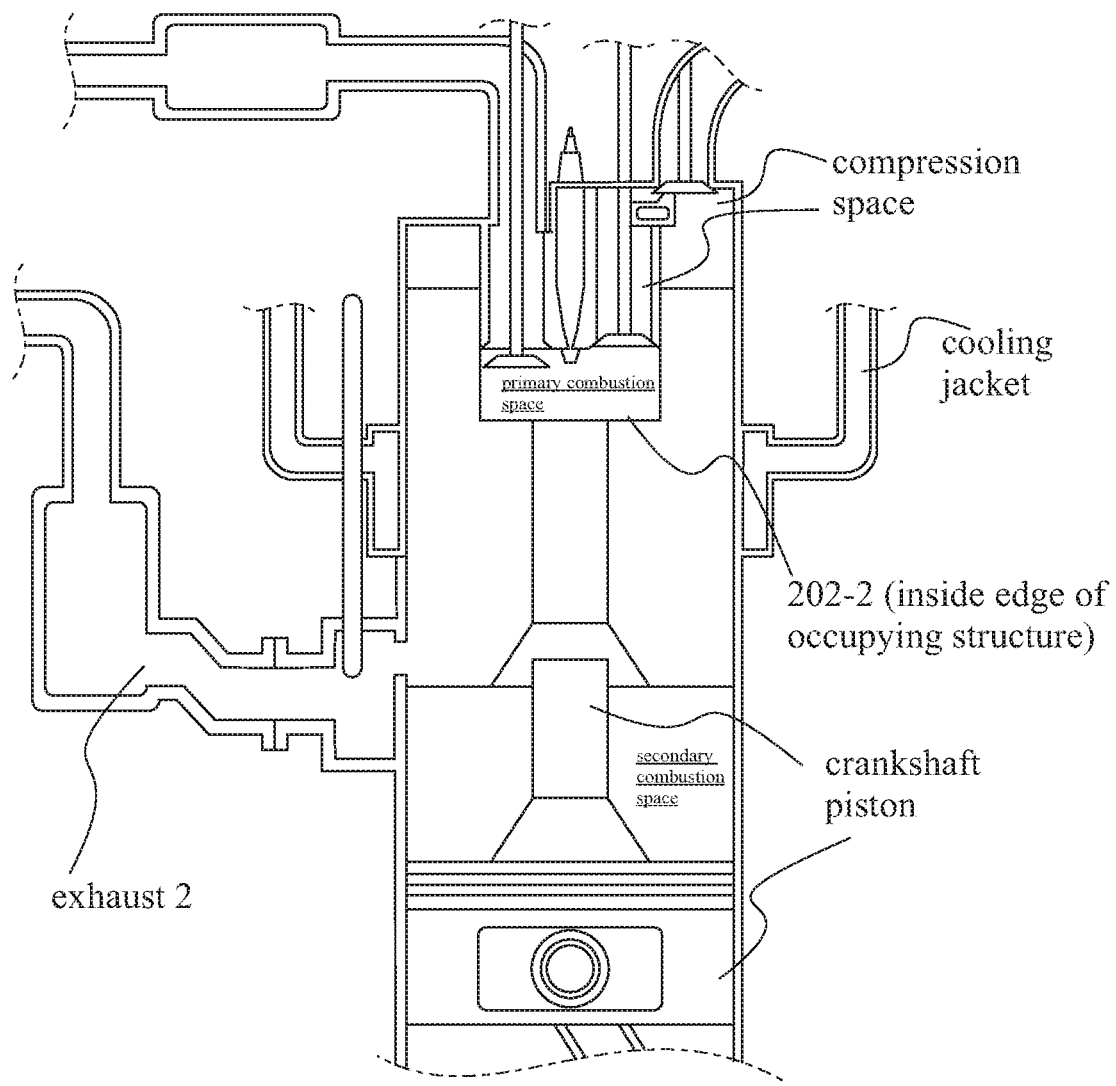

As shown in FIG. 19, disclosed method includes, at 1902 starting combustion within boundaries of moving parts enclosed between a piston and a cylinder occupying structure, at 1904, accelerating both parts into a cylinder internal space until acceleration of the cylinder occupying structure changes direction and subsequently comes to a complete stop during an expansion stroke, at 1906 further advancing or retracting the cylinder occupying structure by way of a force application by a secondary device such as an electromagnetic actuator, hydraulic system, or a turbocharger, and at 1908 compressing and moving precombustion fluid by completely retracting the occupying structure during a compression stroke. At 1907 partial compression of pumped fluid is done in a space separate from the combustion space via the occupying structure during the expansion stroke. As another example, FIG. 36 shows another flowchart with alternative language to the steps mentioned above. It is to be understood that neither of these flowcharts are to be limiting, and are to be accepted as merely examples of what the steps of the method could be with varying language.

The graphs of FIGS. 20-32 show various beneficial attributes of the disclosed cylinder system. If any features of FIGS. 20-32 are not explicitly discussed herein, it is to be understood that any information relevant to the disclosure should be gleaned from the shown graphs and their accompanying titles or accompanying text. It is to be understood that D1-D3 refers to Design 1-Test 3 of the disclosed cylinder system, and reflect different embodiments. D1-T3, for example, refers to "Design 1"-"Test 3".

Figure 20:
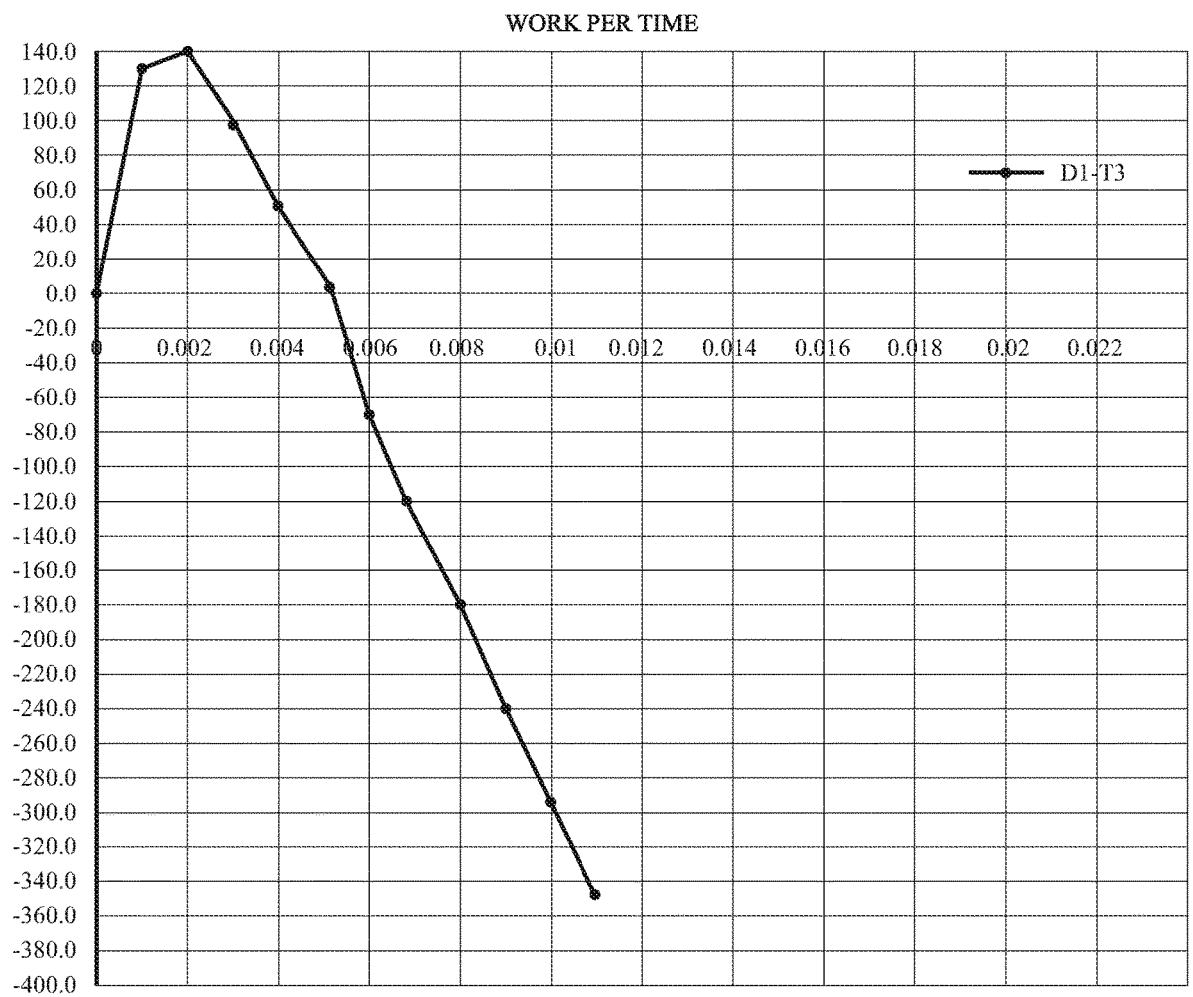
Figure 25:
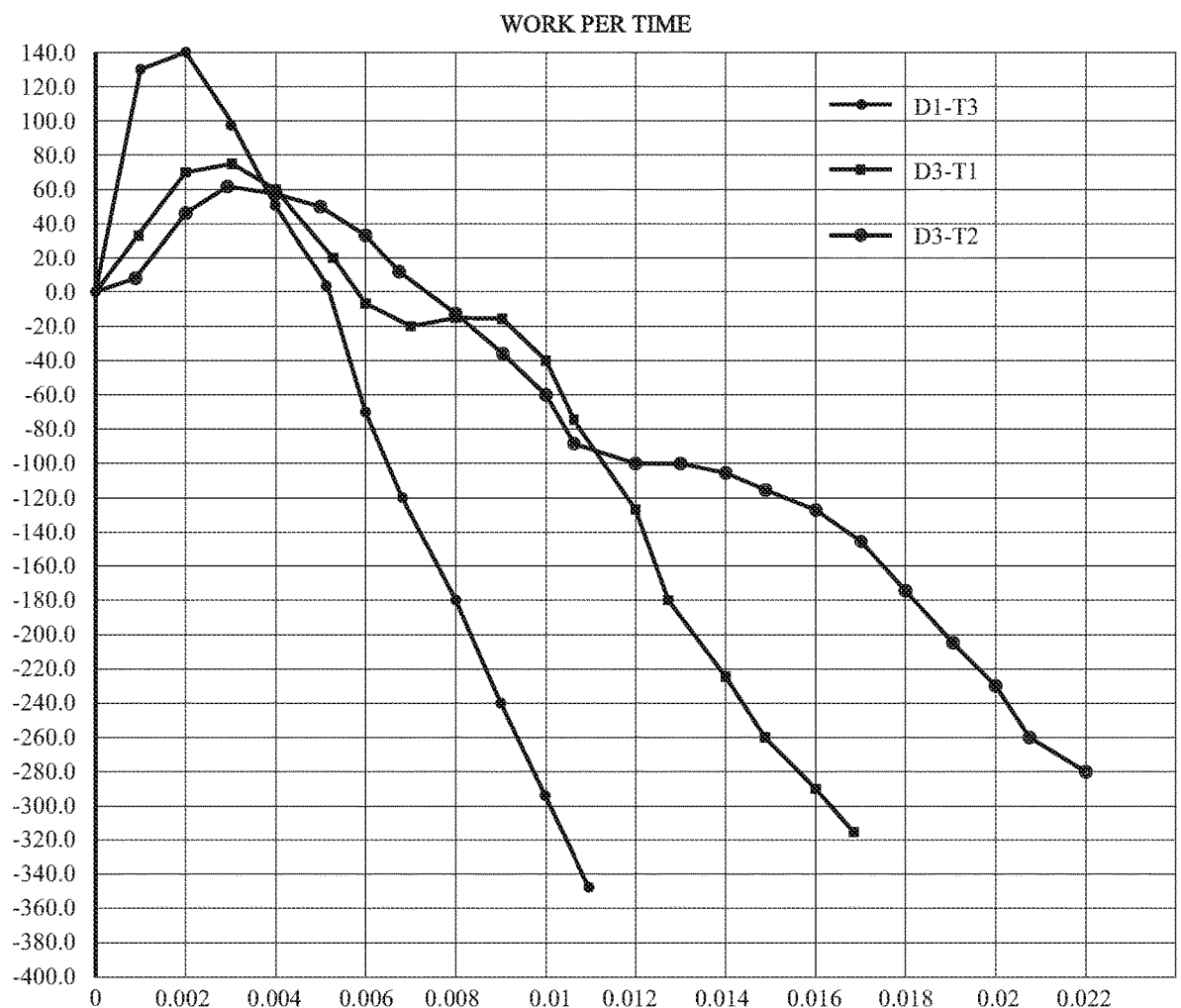

The illustration of FIG. 20 shows metrics of ordinary piston, as an example to compare with metrics of the disclosed piston system, which can be seen compared in FIG. 25.

Figure 21:
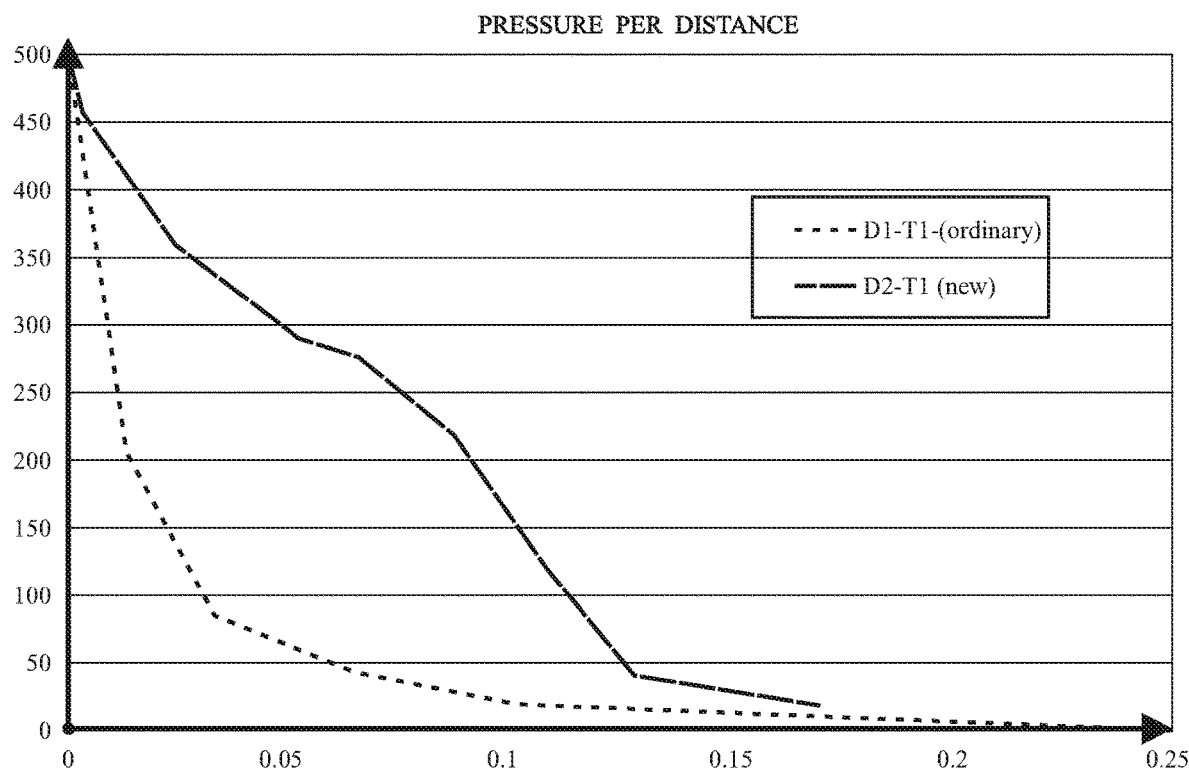

The illustration of FIG. 21 shows a pressure vs. distance graph. The test was done without resisting load. The disclosed system has much greater area under the curve of D2-T1, as compared to a conventional cylinder system of D1-T1. During the expansion stroke, when the cylinder is continuously maintaining higher internal pressure by 300%-400%, this shall reflect as a higher thermal efficiency, higher desirable ratio of NO2/NOx of about 50% and more complete breakdown of the hydro-carbon particles (mass fraction of HC deceased to half with the cylinder occupying structure design). When the test was repeated under resisting load applied to crankshaft piston, the area under graph D2-T1 (named then D2-T3) was showing further increase of cylinder internal pressure when compared with the ordinary cylinder.

Figure 22:
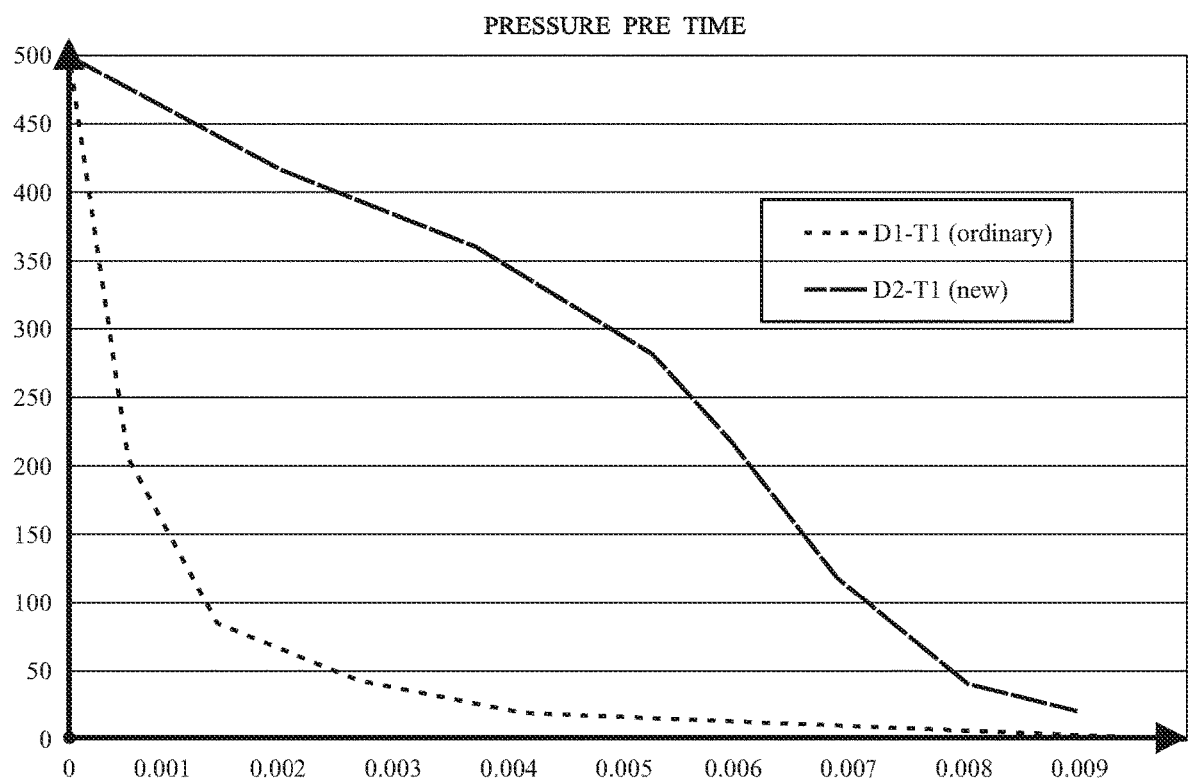

The illustration of FIG. 22 shows a pressure advantage of curve D2-T1, where D2-T1 means a first test of a second embodiment of the disclosed system. Further, FIG. 22 shows a pressure vs. time graph. The test was done without resisting load. The disclosed system has much greater area (about 5 times greater) under the curve of D2-T1, as compared to a conventional cylinder system of D1-T1. Similarly this graph informs us of the great potential of cleaner exhaust burning. Although not shown in FIG. 22, it is to be understood that using premix fluid, pressure will increase to 1500 psi and drops to zero by 0.007 seconds. However, the piston speed will be considerably faster than D1-T3 causing fluid freeze and bad pollution.

Therefore, the disclosed invention slows the piston by applying an initial force to a smaller surface, while increasing internal combustion pressure, to decrease the fluid freeze and pollution, allowing partially premixed fluid through the indirect port injection method to be used with less pollution and fluid freeze. Therefore, direct injection of fuel in the combustion chamber may be partially replaced or assisted by premix method of fuel and fresh air, for the purpose of higher internal pressure while maintaining cleaner fuel burning by decreasing piston speed. Using the disclosed space occupier, and applying a combustion force during the early stage of the expansion stroke to a smaller or partial area of the crankshaft piston causes slower motion with the gain of work energy rather than loss. Therefore, the disclosed system and method may partially allow the use of indirect injection to benefit higher force input with a slower piston movement to benefit cleaner burning.

Figure 23:
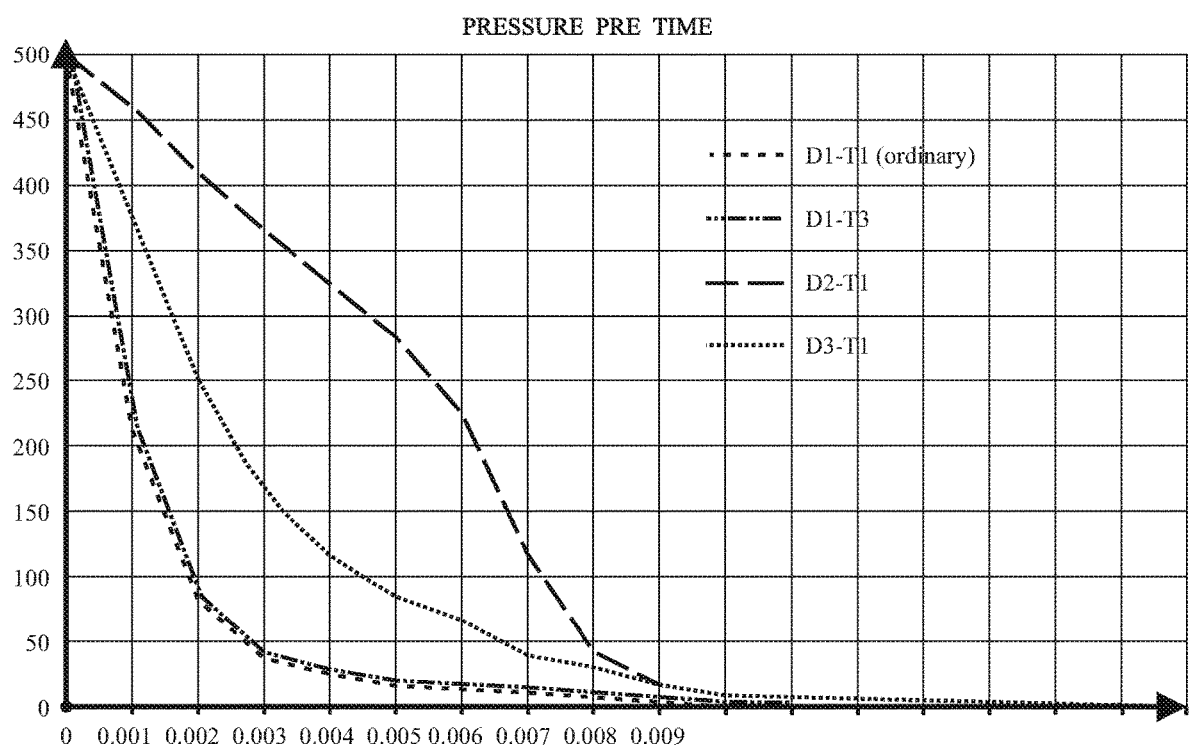

The illustration of FIG. 23 shows a pressure vs. time graph. The test was done without resisting load. In design D3-T1 the combustion space is only facing surface 802 (FIG. 8) without surrounding the element 808 (FIG. 8). In design D2-T1 the combustion space initially surrounds element 808. For design D3-T1 the graph shows that the internal cylinder pressure remains about twice higher than the conventional cylinder, however it is about twice lesser than D2-T1. While there was a decline in internal pressure, the D3-T1 design offered better work energy return than D2-T1. This graph informs us that a working design may be greatly based on energy return and clean burning requirements where one design may be preferred over the other.

Figure 24:
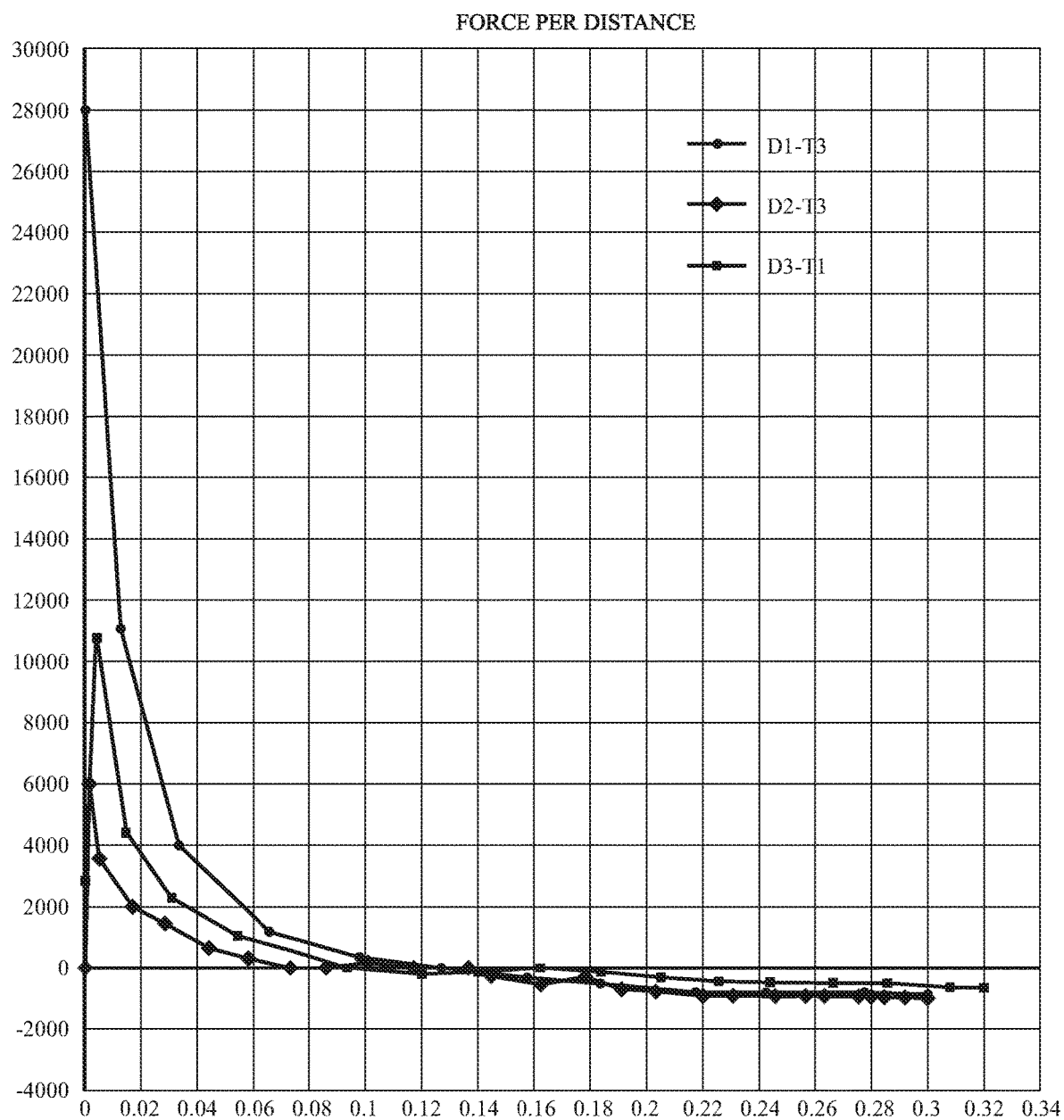

The illustration of FIG. 24 shows a Force vs. Distance graph. This graph shows that D3-T1, where the combustion space initially does not surround element 808 (FIG. 8) offers higher force during the expansion stroke than D2-T1 but less than an ordinary piston. This graph shall not be confused for energy assessment between new and conventional designs, because work energy performance shall be assessed based on (Force*Distance/sec), and that we may call (work/sec) which can be presented as work vs. time.

The illustration of FIG. 25 shows a work energy assessment graph using direct injection and that the new design D3 offers a bigger area under the work vs. time graph than ordinary cylinder design. That is about 200% better work energy efficiency according the area difference. Design D3-T1 has a bigger combustion exposure area (802 FIG. 8) at the beginning of the expansion stroke than D3-T2 due to bigger diameter of the engagement head (element 808 FIG. 8). For that we see that D3-T1 offers higher work energy at the beginning of the expansion stroke and lower work energy later on. When using indirect injection for D1-T3 (graph not shown) the available energy was better and almost twice in the direct injection method compared with indirect premix injection. For that reason, the enhancement accomplished, after we started using direct injection, better energy return and better exhaust compliance, and can now be taken a further step with the disclosed method for better energy return and cleaner exhaust fluid.

The illustration of FIG. 26 shows a table of exhaust mass fractions using ANSYS analysis, and it can be seen that CO reduced 2.5 times, CO2 increased 1.4 times, NO increased 1.08 times, NO2 increased 3.2 times, and C12H23 reduced 5.45 times. Immediately below is a list of information relevant to the table of FIG. 26.

Using similar Initial parameters of Injection Fuel (C12H23) at design D1-T3 and D3-T10 using ANSYS analysis:
  Mass Flow Injection=0.05 kg/s;
  Time of Injection=0.001 sec;
  Pressure of Injection=17405 PSI;
  Temperature of fuel=300 K;
  Mass of Injection fuel=50 mg;
  Nozzle diameter=1 mm;
  Approx. Rotation of Engine=4000 RPM.
  Initial Parameters of Compressed Air:
  Initial Volume=4.81 inch^3;
  Pressure of Air=500 PSI;
  Temperature of Air=830 K;
  Mass Concentration of N2=0.7675
  Mass Concentration of O2=0.2325
  Resistance Pressure=20 PSI (1074 N of resistance on crank shaft piston)

Results: Hydrocarbons output in exhaust (HC) decreased by 5.45 times. If we expect to reduce fuel consumption to 50%, then the overall HC output would be cut by 1100%. CO was decreased by 2.5 times. NO remained at the same level, however that is another potential enhancement with decreasing fuel consumption. CO2 increased by 30%, that is a desirable result especially when it is a result of decreasing HC and CO, and still that is considered another potential decrease with decreasing fuel consumption. NO2 is desirably increased by 3.2 for which manageable product exhaust filters can easily convert to N2 (more expensive filters equipped with early filter working stage may convert NO to NO2). Manageable NO2 and CO2 is OK to increase when such increase is in expense of non-manageable CO, NO and Hydrocarbons.

Figure 27:
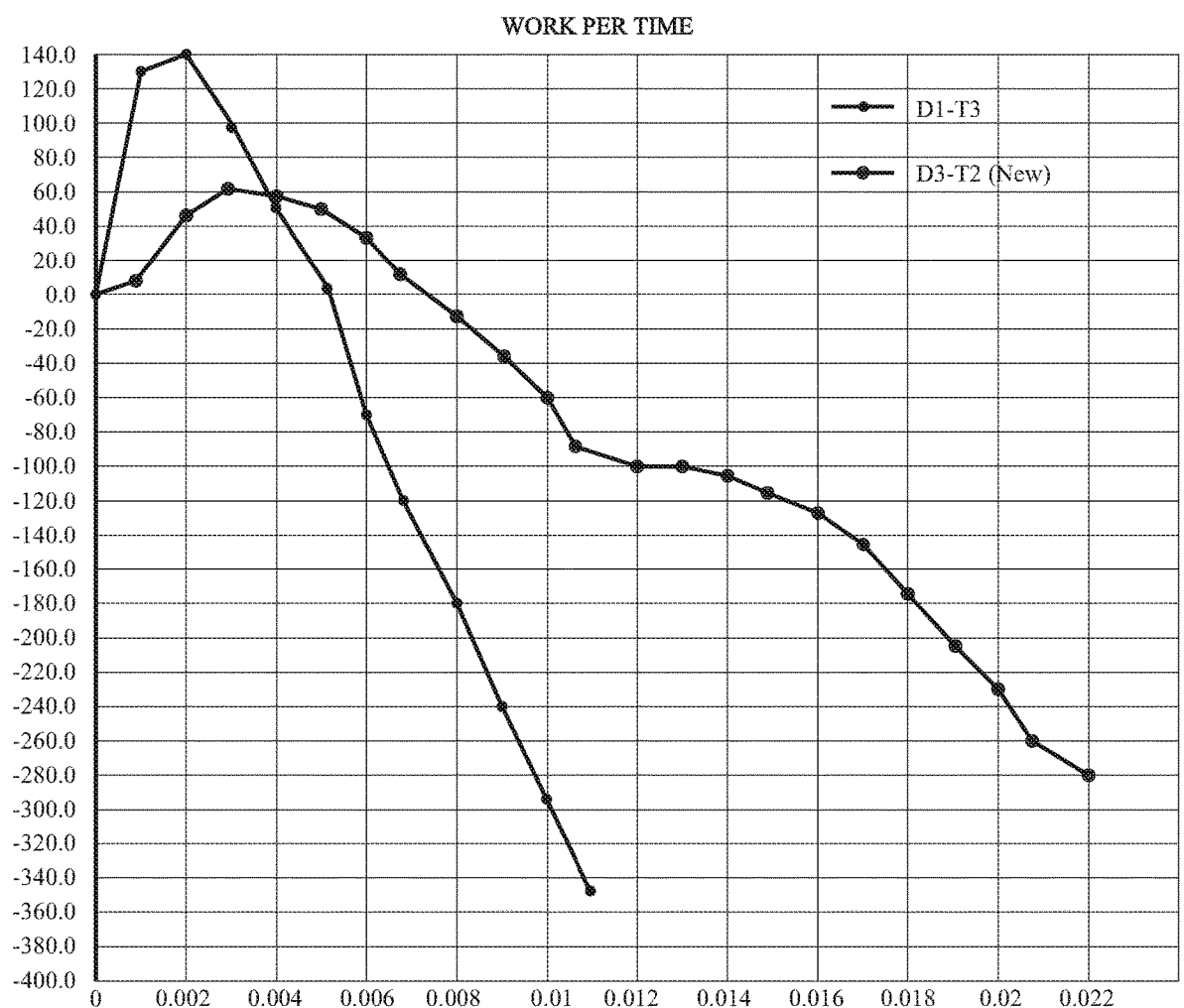

The illustration of FIG. 27 shows, for D3-T2, a work vs. time graph, where the engagement head 808 (FIG. 8) is 2.5" long. The graph shows that work energy is higher at the end of the expansion stroke than the ordinary piston and also than new designs with a shorter head.

Figure 28:
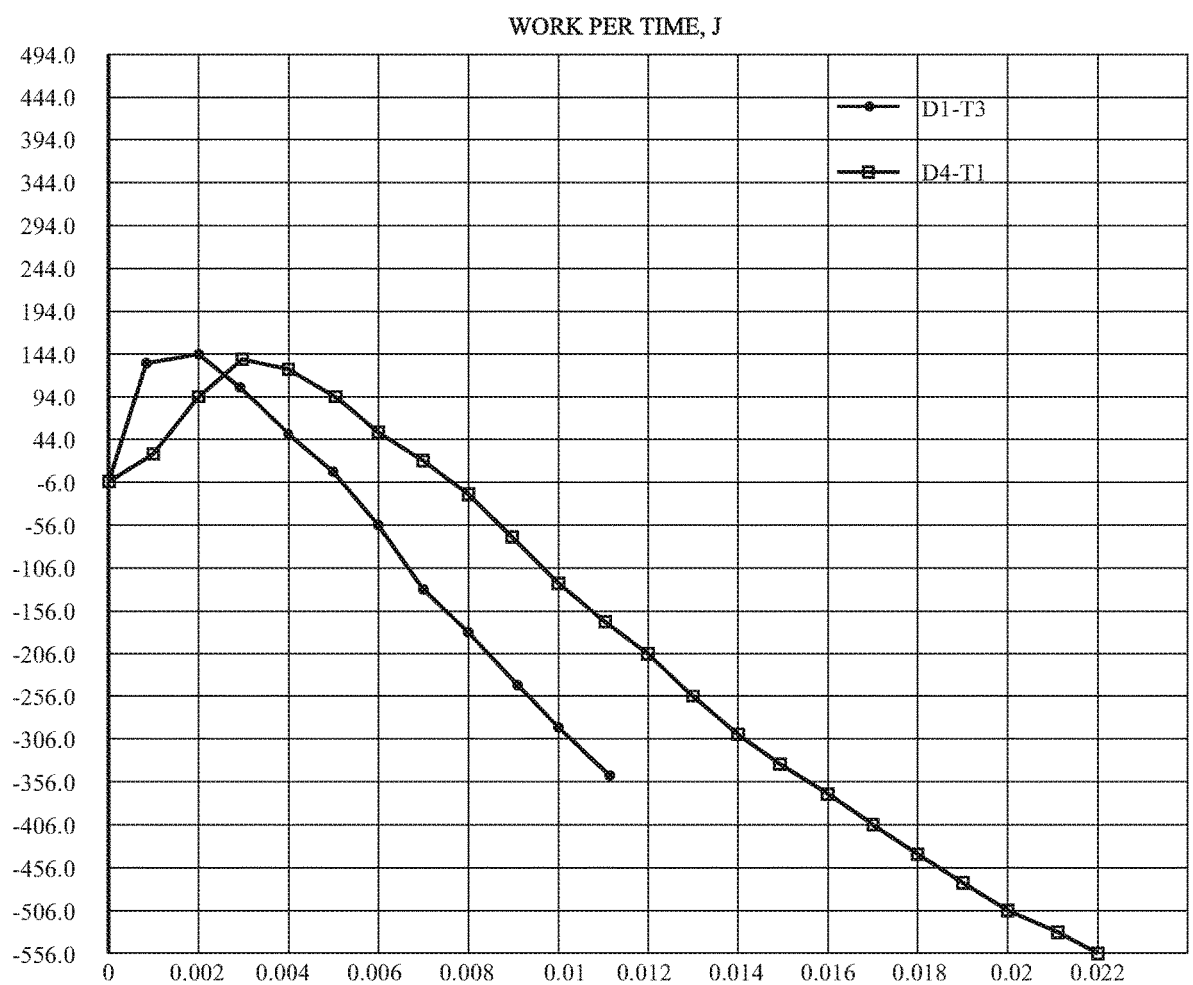

The illustration of FIG. 28, for D4-T1, compares a zero length engagement head with an ordinary piston. The length of element 808 (FIG. 8) in this test is zero and the only engagement between crankshaft piston and the occupying structure was the cone shape center of about 0.5 inch depth. In this arrangement, the occupying structure will not advance and will act as a stationary occupying structure that can be adopted to avoid the complications of more advance engines. The graph still shows a better work energy return.

Figure 29:
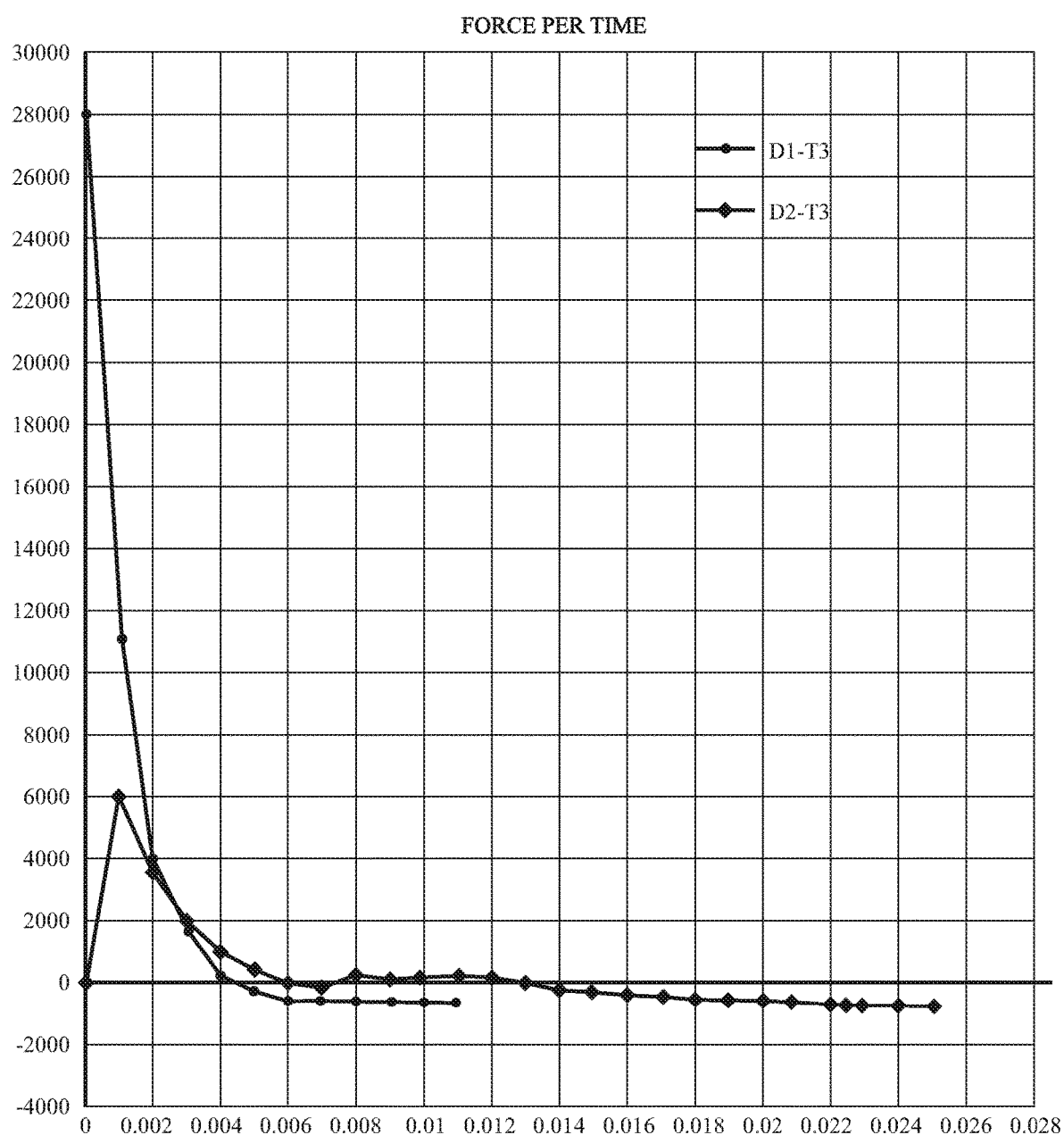

The illustration of FIG. 29 shows, for D2-T3, in the new design, when we apply pressure to smaller surface of working crankshaft piston, energy area under graph is not wasted during the first 10% of power stroke like in the ordinary piston. The more balanced distribution of force along the stroke time in the new design creates better opportunity to modify the amounts of combustion fluid needed for different loads and better ways to save on diesel or petrol. Also the changing size of surface 802 (FIG. 8) gives us design controls on complimenting the requirements of force distribution, the lower the initial force is the more we have available later on during the expansion stroke and the lesser engine vibration we have.

Figure 30:
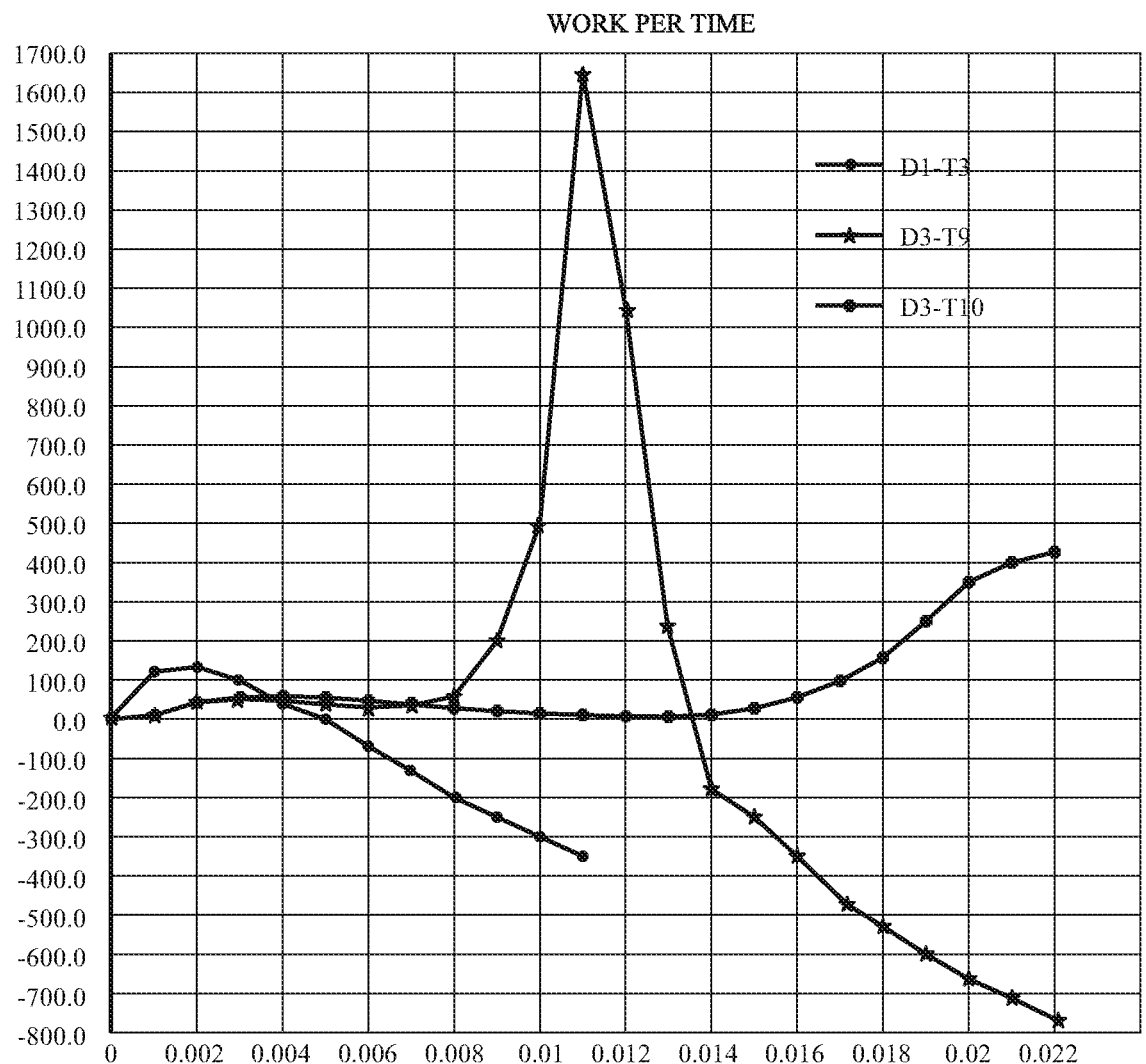

The illustration of FIG. 30 shows, for D3-Test 9, we had 1100 N of resisting load, and we borrowed 8000 N of secondary driving force applied to occupying structure (second piston) at 0.005 second of the expansion stroke. This type of applied force provided a spike of driving force and velocity of the crankshaft piston at about 80% of energy recovery potential, which appeared on the force vs. velocity graph by increasing the crankshaft piston force from 1000 to 8000 N.

Still referring to FIG. 30, for D3-T10 we had 1100 N of resisting load and we borrowed 2222 N of secondary driving force applied to occupying structure (second piston) all the time during the expansion stroke. This type of applied force provided a continuous enhancement of crankshaft piston drive with more than 70% of energy recovery potential. In this test the occupying structure and piston did not disengage during the expansion stroke and piston had a higher pressure and higher driving force toward the end of the stroke. The secondary force of 2222 N, may have been borrowed from recovered exhaust energy and when applied to assist the advance of the occupying structure most of the 2222 Newtons were translated as about 1500 Newton of driving force of the crankshaft piston.

Figure 31:
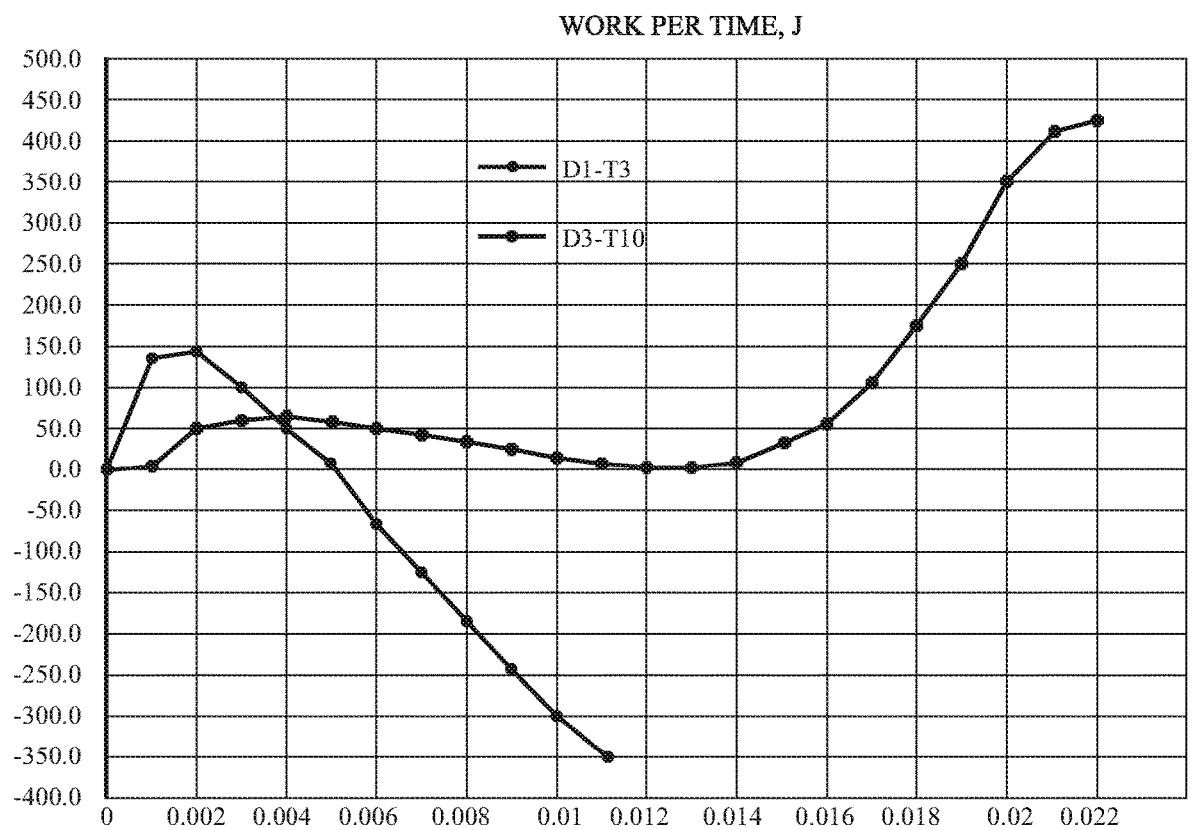

This graph Also shows that assisting exhaust recovery turbo charge forces or magnetic forces may provide unique benefits where energy can be spent only when needed, providing an engine with much higher capacities without the need to increase the number of cylinders The illustration of FIG. 31 shows, for D3-T10 that the graph of the crankshaft piston drive can be continuously positive offering enhancement for lower engine vibration and more uniform motion of crankshaft. The final part of the expansion stroke of a piston can still have enough power to apply to a second piston compression stroke in a laminar non-impulse mechanical motion.

Figure 32:
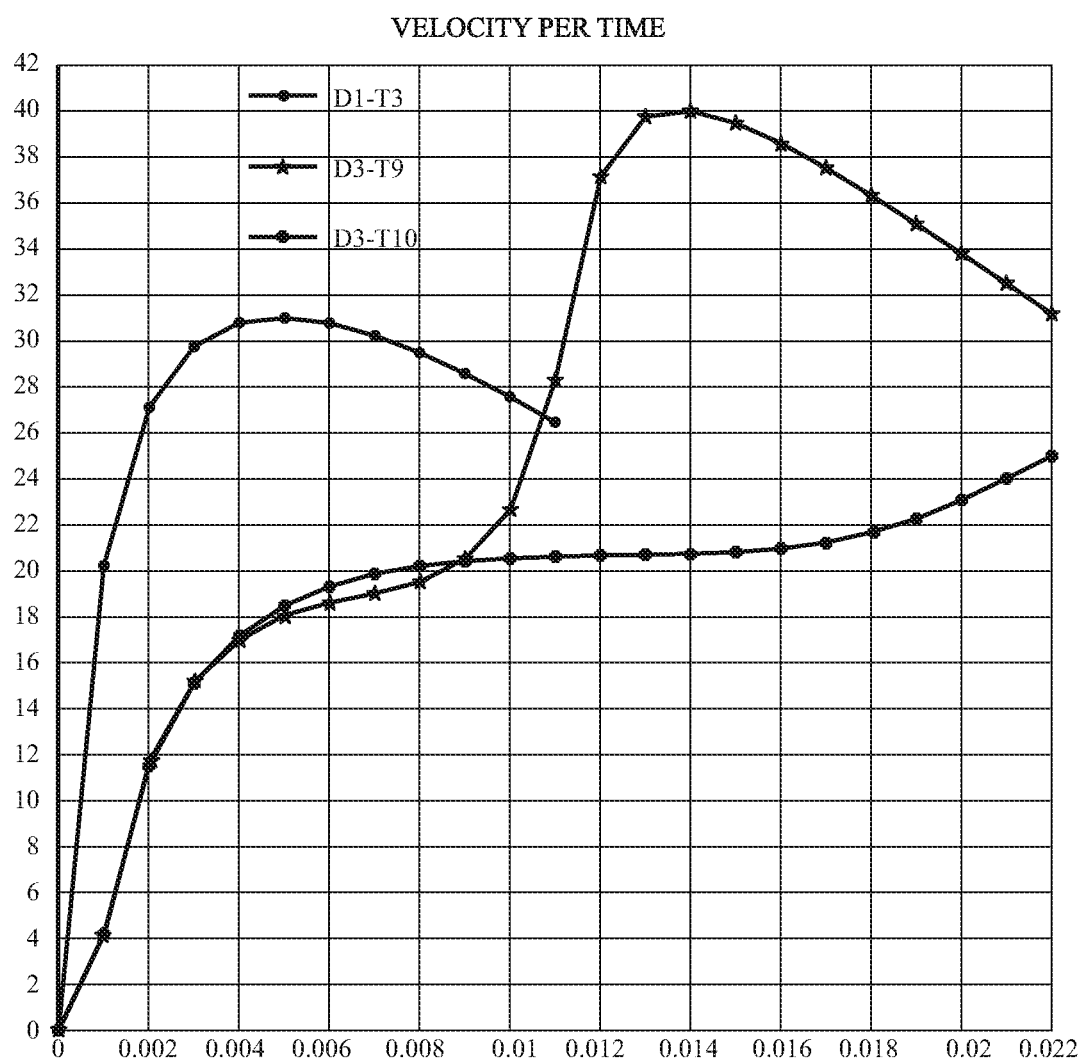

The illustration of FIG. 32 shows a velocity of the piston, and that crankshaft piston speed in the conventional working cylinder is in average about 30-40 meter/second, while without secondary force assistance, crankshaft piston speed with using the occupying structure is about 16 meter/second. From controlled combustion studies, we know the faster the piston expands, the faster and more rapid the cylinder fuel mixture cools down resulting in great decrease in the chemical reaction (often termed as frozen mixture) leaving the exhaust far from chemical equilibrium. Higher levels of NOx, if compared for a given cylinder design with only variable is piston speed, is an example of chemical products that is frozen. We learned that uniform increase of piston speed causes incomplete fuel burning and bad pollution testing results. Therefore, the disclosed model of applying a big force later on after the first half of the expansion stroke, may result in a very big increase in piston speed, however when this increase happens after a period of slow piston motion and after enough time of complete burning, then such increase in piston speed may not negatively affect the goals of better results on cutting pollution.

Further testing shows that lowering speed can be achieved by decreasing crankshaft-piston head diameter (e.g. 802 in FIG. 8) and to have the piston performing at a desired speed, the piston was moving lower than a suggested goal of 16 meter/sec when its engagement head was less that 0.9 inch in diameter.

With respect to pollution and legislations, hydrocarbons (HC) make a challenging pollution issue and we have the best results in cutting its output by 550% using a cylinder equipped with occupying structure. Legislatively on pollution, one of the most important pollutants is NOx (N2, NO2, NO). The ratio of NO2/Total Nitrogen oxides NOx in most vehicles exhaust is usually about 5-10% and optimum would be over 50%. Modern filter treatments of exhaust include an early stage filter intended to convert NO to NO2 and the final process would be converting NO2 to N2. We have a number of design tools to implement for the purpose of increasing the NO2/Nox ratio to the desired ratios and decreasing overall mass of NOx. With a cylinder occupying structure design as disclosed, the main advantages about pollution is mainly comes from reducing the overall fuel usage and enhancing mileage travel per unit of fuel which results in a decrease in the overall heat output where heat is the main factor in pollution output.

In the disclosed method of increasing cylinder internal pressure and decreasing piston speed dynamics, we have hydrocarbon mass fraction being cut by 550%. The NO2 was at a desirably higher rate, where we believe in this method NO2 increase was on the expense of CO rather than NO. NO output with the occupying structure cylinder was about the same of the levels of NO in conventional cylinder at speed cycling less than 6000 rpm however it was decreased when we partly used indirect injection, while N2 desirably doubled the level taking away more nitrogen fraction from the harmful oxidized form, which is also a desirable result reflecting balanced chemical reaction and a process we expect to see from the disclosed system.

When two similar energies are spent to drive two similar weight objects to a similar distance between two points A and B under similar conditions energy is time independent meaning same energy will be spent regardless of how much time it takes to perform such task. If the path is changed however and we spent twice as much energy between A and B, we know we had to work more and if all other variables remain the same, then we know spending twice as much energy is equivalent to doing the same work under same (corrected) conditions for double the distance (and double the time).

In the cylinder example, we use similar physical distance A-B of crank-shaft motion, but with an occupying structure, we change the pressure and surface and according to Pascal law that can be adjusted or corrected to similar force and different relative-distance where such different relative distance is called A'-B' and where according to D'Alimbert who explains that a similar physical distance can be calculated differently in relative motion and a different relative motion between A and B may cause spending different amount of energy based on the value of the relative motion distance A'-B' and that is time dependent energy because the coordinate distance is not the same.

In a piston equipped with a space occupying structure, we do have a relative motion, and the physical distance of the crank-shaft piston shall be adjusted, not because the distance of its motion is changed but because the path between the start and end of its motion is changed in surface and pressure values.

One way to enhance the energy of a piston output is by using as a second piston, an occupying structure that is in relative motion with the cylinder, which is the subject of this application. Simulation charts show effective energy enhancement with potential to either lower fuel requirement to perform a certain task done by a conventional cylinder or by using similar fuel volume to out-perform the conventional cylinder while driving a bigger load.

Using a similar combustion fluid volume and similar weight crank-shaft piston, for driving a similar load, in a similar diameter cylinder, we find that crank-shaft piston speed would be lower by about half in a cylinder equipped with the occupying structure, with some design variables. If we try to compare a crank shaft motion energy between a conventional cylinder and one with occupying structure using similar combustion fluid, similar resisting load, similar cylinder diameter, for a similar clock time and similar distance using an equation of kinetic energy of the moving piston body ($E=0.5*m*v^2$) it would seem that the crank-shaft piston motion in the cylinder with occupying structure is of lesser kinetic energy because the piston motion velocity (v) is less all the time with (m) and is the same for the mass of the combustion fluid or the mass of the piston. But, logic says we have the combustion force deployed in a smaller volume inside the cylinder and it shall compensate by driving the piston and its load for a longer physical distance. Test results also show bigger area under work energy graph where work means ([force*distance]/time).

The immediate conclusion for this discrepancy shall suggest that we are to reform the kinetic energy equation to serve the case of calculating work energy rather than kinetic energy, Where velocity is replaced by acceleration and time and where time include the time period of work (rather than unit of time) which we will call a coordinate time.

Energy=$0.5*mass*(acceleration*time)^2$/time=$0.5*mass*acceleration^2*time$. The unit of energy measure of the equation becomes: $Kg*m^2/s^3$ or $(Kg*m^2/s^2)/s$ which is an expression of energy spent per second or work performed per second or even the power of work.

While we know that work energy needed for moving similar load for a similar physical distance is time independent, it shall be clear that when such distance is changed physically or due to a relative motion then the work energy becomes time dependent and for traveling double the distance we need to double time and energy consumptions. For the occupying structure we use similar physical distance, however to calculate work energy according to Pascal, we can adjust pressure and surface for distance, and to do so we need to build motion coordinates, where we can adjust force and acceleration to similar reference and then the only variable is the distance, where energy consumption becomes dependent on the relative coordinate distance of the crank-shaft motion and its coordinate work time.

Because we are changing the internal volume of the cylinder, we will replace the term fuel mas with the value of mass force (mf) of the moving piston which is measured by Kg*m/s as a time independent dimension of work.

Another adjustment we shall consider is a universal acceleration for both cylinders in comparison to be able to create a comparable motion coordinates and to minimize the variables of such coordinates down to time (t). Any acceleration could be used as universal reference, however the one that is familiar to human observer may be the acceleration of gravity (g). To adjust any acceleration to another with energy preservation in mind we may say, for piston 1: $A_1*T_1=g*t_1$, and for piston 2: $A_2*T_2=g*t_2$. The equation that can compare work energy of the relative motion of two cylinders look like: $Energy_1=0.5*mf_1*g^2*t_1$ and $Energy_2=0.5*mf_2*g^2*t_2$ also we can have this equation measured by work energy coordinate where (mf=z, time independent dimension of work energy measured by Kg*m/s), (g=y, universal acceleration measured by $m/s^2$), (t=x, Time dependent dimension of work energy measured by s).

Figure 33:
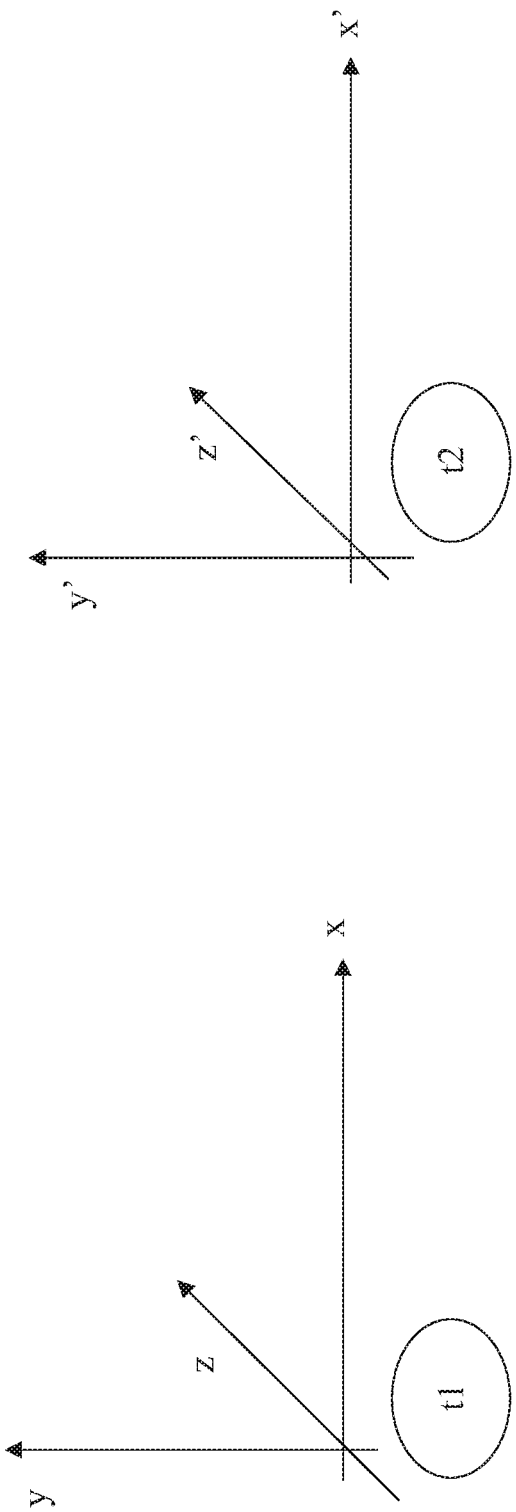
FIG. 33 shows a Galilean and Lorentz transformation, in accordance with aspects of the present disclosure.

The illustration of FIG. 33 shows coordinates for equation $E=\frac{1}{2}*mf*g^2*t$ where mf=mass force on z (g) is universal acceleration reference on y universal time coordinate (t) on x. To clarify the concept of gaining energy from relative motion without breaking the rules of energy preservation, we can call E=thermal energy of the fuel used for combustion. When we use similar fuel in two different pistons, then $E_1$ is for piston 1 and $E_2$ is for piston 2. Therefore, E1=E2 and $0.5\ mf_1*g^2*t_1=0.5*mf_2*g^2*t_2$ $mf_1*t_1=mf_2*t_2$ (time independent work energy of piston 1\*time 1 of work=time independent work energy of piston 2\*time 2 of work)

When t1 for conventional cylinder=4 second (where average piston speed=39.2 m/s); t2 of modified cylinder=2 second (where average piston speed=19.6 m/s). when time 2 is smaller, then its associate work energy $mf_2$ is bigger and such work energy is available independent of time.

When mass is replaced by mass force, then mass force of 1 kg is estimated by 1 Kg-meter/second and this force is called work energy per second with a value independent of time. The available work energy for a conventional piston (the mass force acting on the piston during the expansion stroke, per meter per second) is half the value of mass force work energy acting on piston in the modified cylinder. Note that the average speed of the piston in the modified cylinder as claimed is lower than the average speed of the piston of the conventional (ordinary) cylinder.

Further the illustration of FIG. 33 compares motion coordinates between conventional cylinder xyz and a cylinder with occupying structure x'y'z' and for the purpose of analyzing the relative motion for better system design controls, we tried using coordinates of the relative motion in a first method based on our understanding of special relativity where we shall use independent time reference of each cylinder (t and t') for coordinates and where acceleration adjustments are not allowed because all accelerations were adjusted to its final destiny "C=the speed of light" which resulted in the famous equation ($E=m*C^2$) and where clock time become the variable to adjust according to Lorentz formula for t and t' in a second method, using our understanding of Galilean transformation of assigning a universal time for both coordinates. With X'Y'Z' representing the motion with occupying structure, pistons of different acceleration are adjusted to (g) instead of (c) the speed of light, $t_1$ and $t_2$ represent adjusted time of the average velocity of the crank-shaft pistons to its comparable value under the universal acceleration of (g) meaning if a piston average velocity is 19.6 m/s that is like t=2 second which is the time lapse needed by a free falling object to reach 19.6 m/s. XYZ and X'Y'Z' represent the dimensions of a suggested relative energy equation (E=0.5 mf*$g^2$*t) that may compare work energies of two motions, where (t) is the acceleration adjusted time on x, (g) is the universal acceleration on y (in special relativity this would be C), mf is the force (pressure*surface*physical distance/sec) on z. Using similar elapsed clock time of motion we find that using occupying structure (with a slower measured piston speed) we need lesser coordinate time(t) of acceleration to match similar work force per second of a conventional cylinder.

Calculating energy savings from the use of the disclosed occupying structure of a piston in a second coordinate x'y'z' according to Lorentz transformation and the special relativity method, shows that the relative time adjustments of (t' to t) is infinitely small due to the huge difference between the speed of a piston and the speed of light.

While adjusting time ($t_1$ and $t_2$ to t) in reference to piston speed of a first and second cylinders in relevance to gravity (g) according to Newtonian relativity-Galilean transformation is in correlation with test results where $t_1/t_2$ explains the difference of areas under graph of work energy. The equation Work energy=½*mf*$g^2$*t measured by (Kg*$m^2$/$s^3$) makes a design and control tool needed to decide the size of surfaces and occupying structure needed to provide a certain performance.

Test results show that the ratio of $t_1/t_2$ using Newtonian-Galilean relativity reflects energy savings proportionate to ratio of area under the curve of work energy as measured by computer simulation, while using the special relativity method was giving results frozen in time not reflecting energy differences regardless of design.

It is to be understood that when work energy is greater under graph of a cylinder equipped with occupying structure, then lesser coordinate time of acceleration ($t_2$) is needed on x to achieve similar energy levels of a comparable conventional cylinder and in that meaning we may express that in relative motion, energy saving is in exchange with time according to Newtonian relativity and the fact that time is a true form of energy.

The disclosed method and system decreases hydrocarbon and CO in exhaust fluid by means of structural and pressure modification at the cylinder level of an engine by using a space occupying structure within a cylinder. Further, fuel requirements are decreased to perform certain mechanical work tasks by means of having the combustion space contained within a moving body that is in relative motion with the cylinder. The system and method uses relative motion for saving energy, where such saving is in exchange with time according to Newtonian relativity and Galilean transformation.

The herein disclosed methods may include: 1) a hybrid engine method utilizing two sources of force at the cylinder level. 2) A method of exhaust fluid filter work at the cylinder level by converting bigger portion of CO and free hydrocarbon radicals into manageable $CO_2$, $N_2$, and $NO_2$ by increasing the relative internal pressure and decreasing crank-shaft piston speed. 3) a method of cutting on vibration by using an occupying structure as a shock absorber. 4) A method of saving energy by means of using an occupying structure as a second frame in a Newton-Galilean relativity. 5) a time dependency method of energy exchange and savings.

Due to the shape of the occupying structure, during the expansion stroke a decrease in fluid intake requirement is effected. For example, if the swept volume of the crankshaft piston is 10 cubic inches then in the disclosed relative motion cylinder, the combustion space in both a primary and secondary combustion space would be about 5 or 6 cubic inches, much less than the swept volume of the crankshaft piston (about half or 1 cubic inch over half).

It is to be understood that advancing the occupying structure into the cylinder, mainly into a combustion cylinder, is used to manipulate the combustion or hydraulic forces to perform more torque or more horse power or to optimize the power in different conditions. The disclosed relative motion cylinder enhances power output greatly especially if optimization is performed for torque and horse power. Such enhancement is based on a Pascal function of time. For example, the study of physics portrays that energy can be spent during a vehicle's motion due to friction, between the wheel and the road, which is only a very small percentage of energy spent on motion. Most of the inefficiency is located in the energy spent to move the vehicle on accelerating the crankshaft piston, and if the value of such acceleration, calculated per second during an hour of motion, is half the value of another vehicle in a similar weight, and for a similar clock time of motion, then the first vehicle would need half the fuel to reach a similar distance. For such acceleration time, we introduce an energy equation as a function of time (E=½ Mf*$g^2$*t) which is explained further herein. This equation shows how (t) time (acceleration time) is in exchange with work energy calculated by Joules, where minimizing the value of (t) from 2 seconds to 1 second changes energy output from 1 Joule to 2 Joules, which happens before optimizing the output to be deployed for more torque or more horsepower. And this is the core difference between this application and between prior attempts to solving engine efficiency, because thermal output is considered fixed per cubic inch of fuel regardless of mechanical design, and where minimizing the value of time significantly changes the energy output.

In the disclosed novel system, one power stroke is achieved per reciprocating cycle rather than every other cycle, which cuts down on friction losses by 15% of an overall thermal potential, by separating compression from combustion spaces, and not through using conventional two stroke cylinders. For example, four strokes per two piston reciprocating cycles loses over thirty percent of thermal potential power output due to friction forces, and the disclosed method solves and improves upon this problem. Additionally, one power stroke per every other reciprocating cycle in traditional SCCI and SCSI and HCCI engines means that about 6000 RPM is a highest allowed reciprocation limit for a given power output, where challenges can be seen for engine breathing supply and mechanical failures, and the disclosed method solves this problem by way of the occupying structure to separate compression and combustion compartments to allow the engine to operate in one power stroke per reciprocation cycle. This means that a typical RPM of 6000 is actually reduced to 3000 RPM, where observed can be a 15% power output advantage with a 50% friction loss, more air breathing and less mechanical failures. This is before counting losses spent on compression, where also the disclosed system aids since every Joule spent on compression is a joule used indirectly to increase the internal combustion pressure, or a Joule recovered by adding a force to a crankshaft piston during a power stroke.

One of the main advantages of the disclosed system is that by variably introducing the occupying structure behind the motion of the crankshaft piston, during an expansion stroke, space of combustion fluid or pressured hydraulic fluid is smaller than space volume displaced by the crankshaft piston during the expansion stroke. The disclosed system introduces the Pascal function as a function of time, where time of acceleration is found to play a role of not only being a coordinate as known in Newtonian or in special relativity physics, but as a form and a source of energy, where objects, in its motion as a function of time, may exchange energy measured by joules with time of acceleration, and where a unit of energy like Newtons, will not be sufficiently defined by physical distances when the motion is in fact a function of time. As a function of time, it is not enough to calculate the physical distance traveled by the crankshaft piston, to know how many Newtons are needed for such motion, but instead we need to define a virtual distance traveled, based on different conditions of pressure and space displacement, before calculating the Newtons.

In the disclosed method, the compression may start during the expansion stroke, within a dedicated space, after an initial decompression phase, where such dedicated space, is separate from the combustion space, by the occupying structure, and where compression ends with the end of retraction stroke of the crankshaft piston, allowing to perform all the four independent stroke functions, of a four stroke conventional combustion cylinder, during one reciprocation or one cycle of the crankshaft piston, rather than two.

Figure 35:
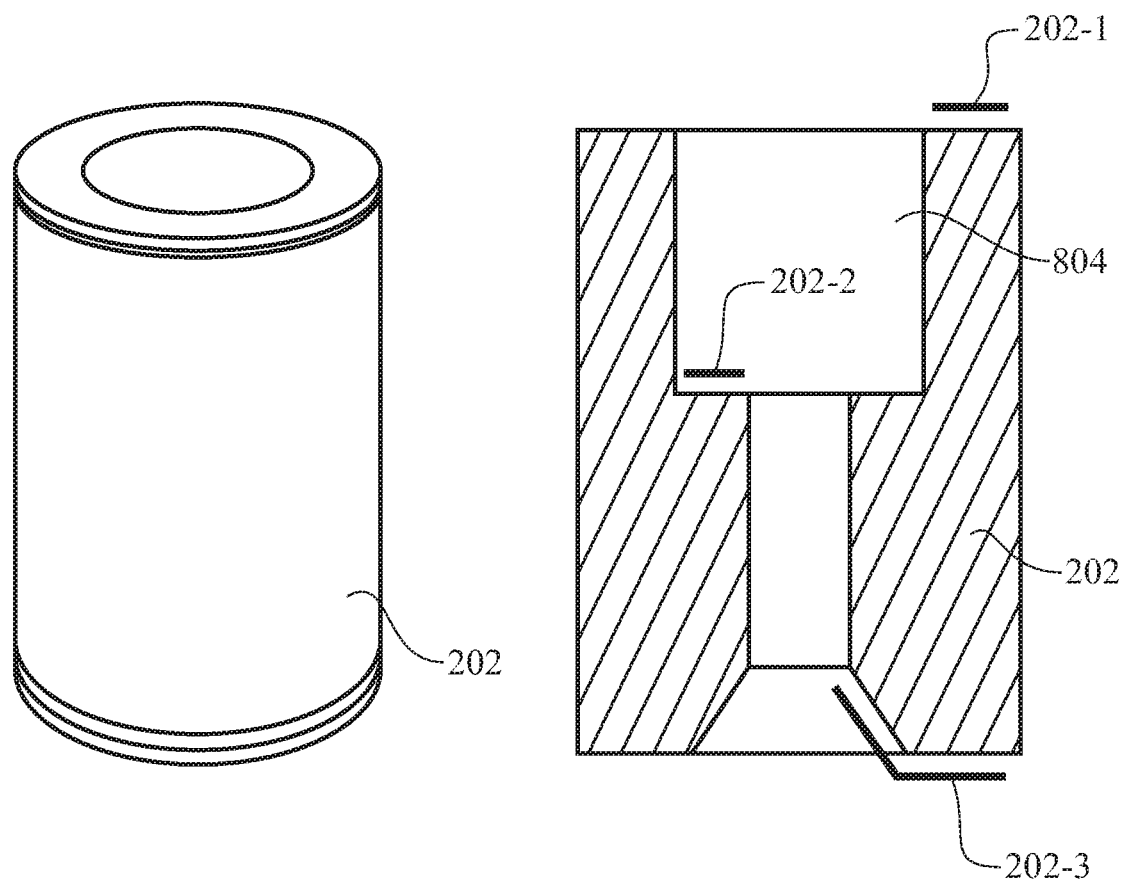
FIG. 35 shows an example occupying structure and its various edges and surfaces; in accordance with aspects of the present disclosure.

The illustration of FIG. 35 shows an edge 202-1 of an occupying structure facing a compression space and edge 202-2 of occupying structure facing primary combustion space, and edge 202-3 of occupying structure facing a secondary combustion space. Edge (202-2) when subjected to combustion, or when there is an increase in hydraulic pressure, causes the advance of the occupying structure variably in the internal space of combustion or a hydraulic cylinder and causes a change in the physics of Pascal as a function of position. A power output of a stroke is dependent on a crankshaft piston surface and distance of stroke to Pascal as a function of time, where additional power output is to be calculated and added to Pascal as a function of position. That addition is proportionate with the combustion or hydraulic volume displaced by the advance of the occupying structure.

In the disclosed Relative-Motion cylinder solution, an occupying structure within the cylinder, separates between a dedicated compression space and combustion space. The occupying structure, completely contains combustion fluid, between cylinder head and between crankshaft piston, where such containment continues during an early part of expansion stroke. The cavity of the occupying structure, contains an edge surface facing the camshaft side of cylinder. The surface area (202-2) is smaller than the surface edge facing the crankshaft piston, allowing an initial acceleration of occupying structure, in the crankshaft direction, and in an opposite direction later on during expansion stroke. Having an edge within the cavity of occupying structure, secondarily serves creating turbulence of fluid motion between primary and secondary combustion compartments, to allow better mixing of fluid and more complete burning.

Furthermore, with using a force application mechanism, torque can be enhanced when needed by activating a force application mechanism, which can be a magnetic force application or a turbocharge application, to further accelerate the occupying structure during an expansion stroke, causing an increase in the internal pressure of the combustion space without the need to suddenly use more combustion fuel, and without the need to exaggerate in the increase of a Rod/Diameter ratio for a crankshaft rod or mechanical gear. A crankshaft can also be connected to electric generator.

Turbocharge can be used in engines to enhance the compression ratio of pre-combustion fluid. Turbocharge in the disclosed application is used as part of a force application mechanism, to manipulate engine acceleration by force advancing the occupying structure, or through decelerating engine by minimizing pressure in the compression space. The turbo charge in this application can also be a force application mechanism, that may connect multiple cylinders to a wind turbine. In today's practice, the unsteady wind speeds, creating unsteady rotation velocity of a wind turbine, creates difficulties in connecting a wind turbine to electric motor, solved by either expensive brakes arrangements or by positioning a pressure accumulator between the wind turbine and the electric generator. In the disclosed relative motion cylinder, due to the advantage of occupying structure, an assembly of multiple cylinders can be positioned between electric generator and a wind turbine, where the wind turbine would drive and operate a hydraulic turbo charge pump, and where the operated fluid, is driven toward one or more cylinders, such that during a high wind speed, a force application mechanism, will direct fluid to more cylinders and still maintain steady velocities of operated electrical generators.

As shown throughout graphs of FIGS. 38-42, completely eliminating hydrocarbons is doable in a Relative Motion Cylinder. H12C23 tests showed 500% reduction of hydrocarbons, where mass fraction in comparable direct injection parameters decreased from from 6.59% to 0.67% at 18:1 compression ratio. Using 10:1 compression with a (premix and turbocharge forces) Hydro Carbons were completely eliminated, with 0.000000 parts per million found in the exhaust. The disclosed premix option alone (without turbo charging) will eliminate this black material output of exhaust down to 0.00024%, which is 1000% less than it is in the direct injection method. The premix, can be partly used in the Relative-Motion Cylinder, with controlled CO2 output level, while in a Conventional Cylinder, premixing would increase CO2 by 500% to levels prohibited everywhere.

Non-manageable exhaust CO and NO reduction was proportionate with increasing internal pressure of primary combustion space, however with earlier mix of fuel and air, CO was completely eliminated with zero output was possible to accomplish. NO was decreased to 35 parts per million, compared to 11,000 parts of conventional cylinder.

Internal pressure in a Relative Motion Cylinder, increases with higher driving loads, applying turbocharge forces, or using earlier injection or premix fluid. Due to increased combustion pressure with modified piston speed, in the disclosed Relative Motion Engine. CO mass fraction at comparable direct injection test parameters was reduced from 4.43% to 1.76% at 30:1 theoretical compression ratio at 18:1 the system may lose such advantage, and learning from these numbers, the system used 10:1 compression ratio with applied turbo charge forces, using premix fuel the system achieve 0.000000% output of CO. Usually, combustion complete burning efficiency is associated with lower CO, and lower hydrocarbons.

The NO final tests dropped NO from 11,000 parts per million in conventional cylinder to only 35 parts per million with Relative Motion design using premix fluid and turbocharge forces. The capability to eliminate NO, by cylinder design and sizing, can save on the need for expensive early filtration methods intended to convert non-manageable NO to NO2.

As can be seen, more work energy availability offers higher torque/horse power output or lower fuel requirements. Using Adiabatic process calculation, of combusting 50 mg of similar fuel, in a four inches diameter cylinder, we enhanced work output from 150 Joules to about 400 Joules, and with turbo charging the power stroke, we had about 800 Joules of work output. Calculating useful energy by deducting friction losses, will further increase the benefits of the Relative-Motion Engine. Also while a compression stroke makes a loss of a power stroke effectiveness in conventional cylinders, it is simultaneously recovered in a Relative-Motion cylinder, by increasing the adjacent cylinder's mean effective pressure The Relative-Motion Cylinder, as a function of time, introduces the concept of negative mass moving to a positive distance, which mathematically means in Newtonian terms, producing rather than consuming energy, where, our method of dealing with such statement, is done by using complex numbers, to address the negative values of mass.

The negative mass in our method, represents combustion fluid volume, that is displaced, and reduced in volume by the occupying structure, to be less than the displacement volume created by the motion of crankshaft piston, and calculated as (Negative mass=a crankshaft piston surface multiplied by a stroke distance minus available combustion space).

The energy difference in such power stroke, in presence of the occupying structure, is a function of Time, where time becomes a direct variable in energy output equation, by way of modifying physical distance value to a shorter virtual distance, calculated by seconds rather than meters, where, Work energy=½ Mass-force*Acceleration squared*T (W=½ Mf*g$^2$*t), and where (t) is time lapse of universal acceleration to reach an average speed of studied motion.

In another way of traditional math calculation according to text books, A cylinder performance can be calculated according to the following equation: Performance is proportionalte with the mean effective pressure/displaced volume. Pressure graphs in computer simulation tests, shows that containing combustion within the occupying structure, can increase the mean effective pressure by 200-300% in average, and space volume displaced by crankshaft piston motion during a power stroke, is occupied by not only the combustion or hydraulic fluid but also by a progressively advancing occupying structure, which can compete for about 50% of such volume displacement. As a result, the energy output advantage can be calculated in our Relative Motion method where performance enhancement=mean effective pressure*200%/Displaced volume*50%, and that equals to 400% enhancement.

Thermal calculation of fuel potential energy, does not allow according to text books for more than 15% enhancements of a cylinder's performance, and the Relative Motion, advancing performance to 400% can only be calculated by using new physics of Relative Motion as a function of Time, where time of acceleration is a form of energy.

A floating ring can separate and isolate compression from combustion in the primary and secondary spaces while the occupying structure can completely surround the combustion space during an early stage of combustion.

Figure 34:
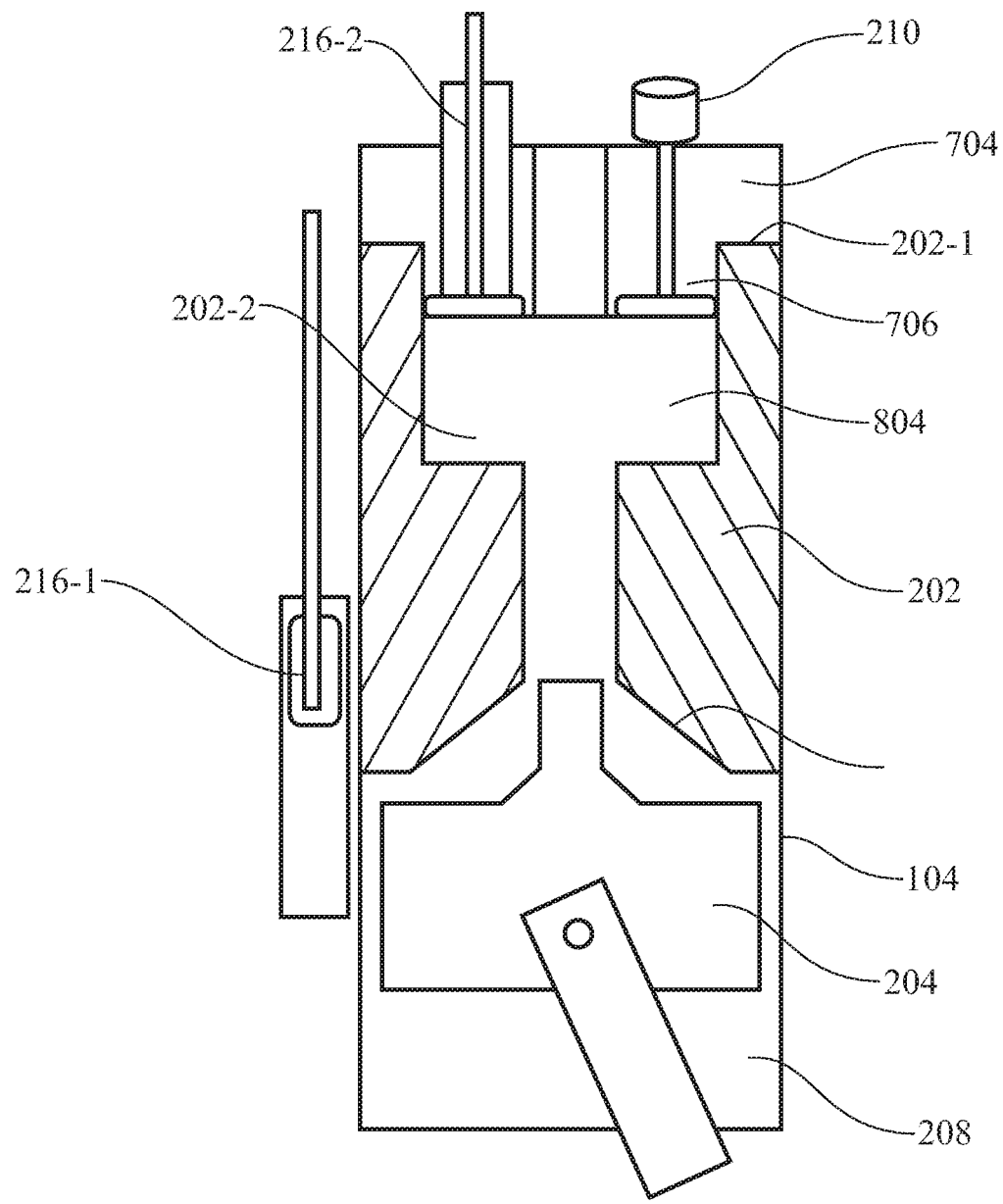
FIGS. 34 and 37 show another example of the disclosed cylinder occupying method where a separate space is shown behind a cylinder occupying structure, in accordance with aspects of the present disclosure.

As shown in FIG. 34, 202-1 is an occupying structure interface with a compression space, 202-2 is an occupying structure edge, separating primary and secondary combustion spaces, 202-3 is an occupying structure surface interface with secondary combustion space. The difference between surface 202-3 and 202-2 causes the acceleration of the occupying structure, during early stages of expansion stroke, and then deceleration and retraction during a later stage.

As shown in FIG. 35, 300 is a crank shaft, 301 is a crankshaft diameter, and 302 is a crankshaft rod. In a Relative Motion cylinder, the system is able to provide more torque by way of supercharging compressed fluid during early stage of expansion stroke, and the ratio of the crankshaft rod (302)/crankshaft diameter (301) can be reduced to a lesser standards than used today in commercial heavy vehicles, for accommodating higher torque based on a longer rod, causing or accommodating slower motion of such heavy vehicles.

The system provides work per time enhancement, when applying hydraulic turbocharge, as a secondary force mechanism, to increase compression forces, during an expansion stroke, which translate as a further increase in pressure within the combustion compartment and as additional drive force. Maintaining positive force drive in a cylinder minimizes the acceleration time of work as a result eliminating part of required work energy. In comparison, compression forces in a conventional cylinder, results in a complete loss of energy which is ultimately deducted from power stroke forces.

Text books of combustion work, calculate that the maximum possible thermal enhancements of combustion work output, possible by design, is limited to 15% based on calculating thermal loss and friction waste of energy.

Figure 38:
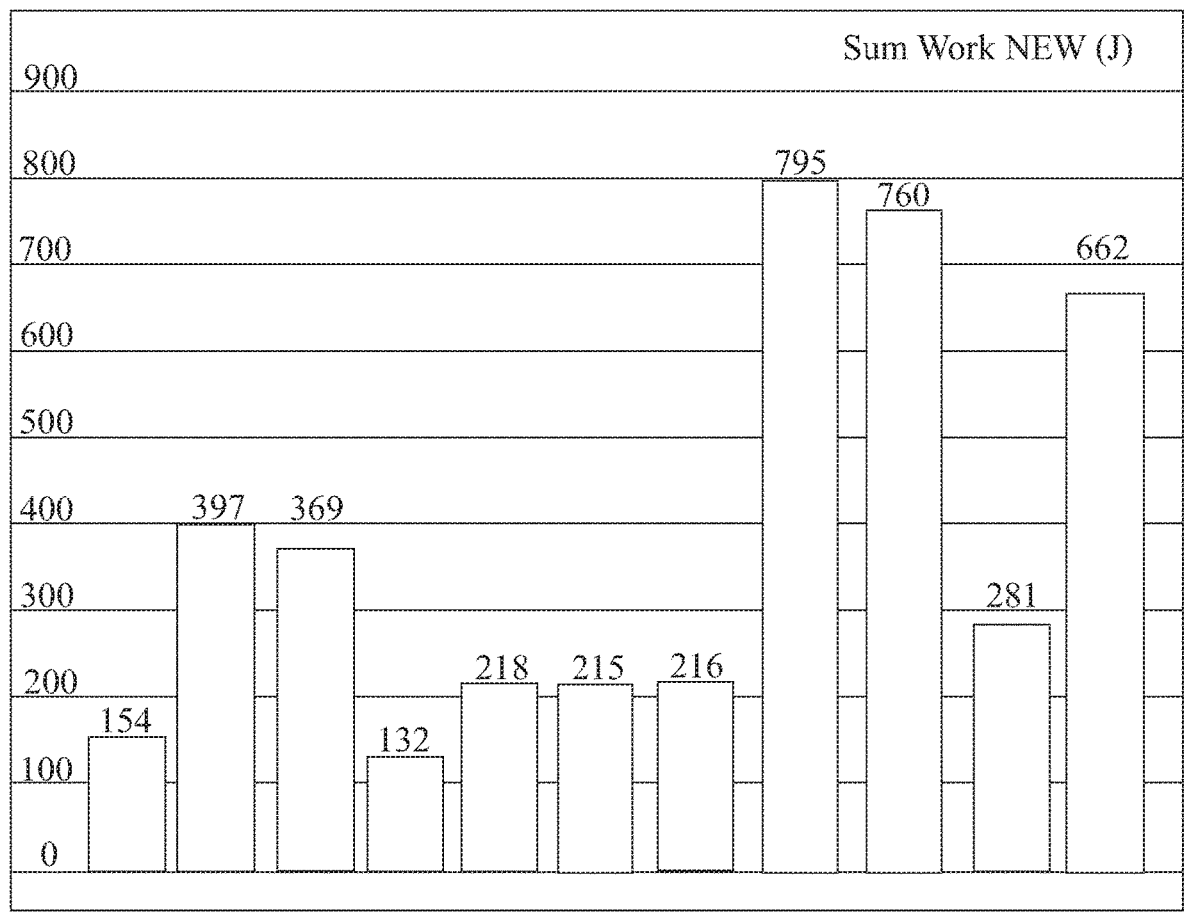
FIG. 38 shows a graph of work output for various designs.
Figure 40:
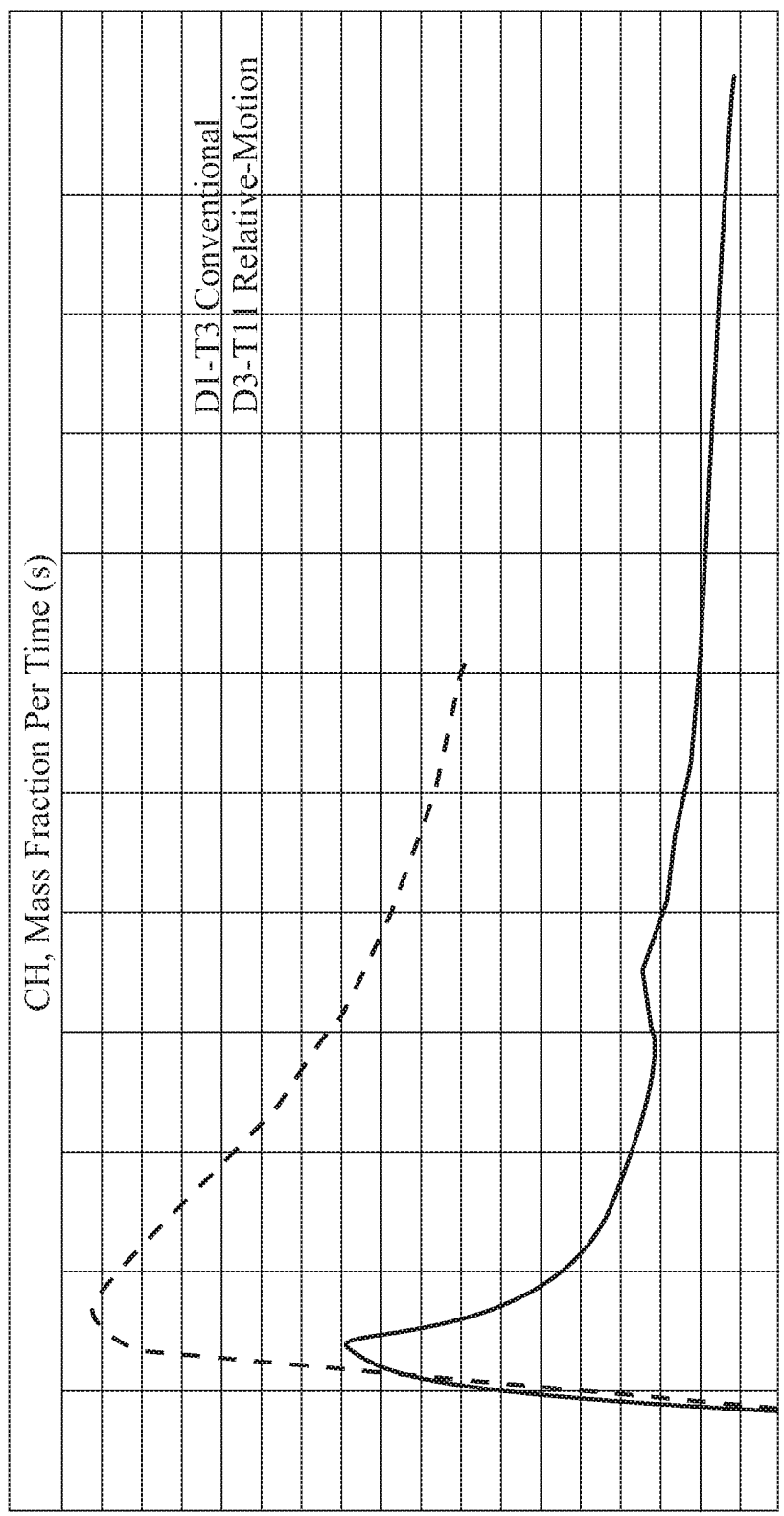
FIG. 40 shows testing results for chemical and exhaust, in accordance with aspects of the present disclosure.
Figure 41:
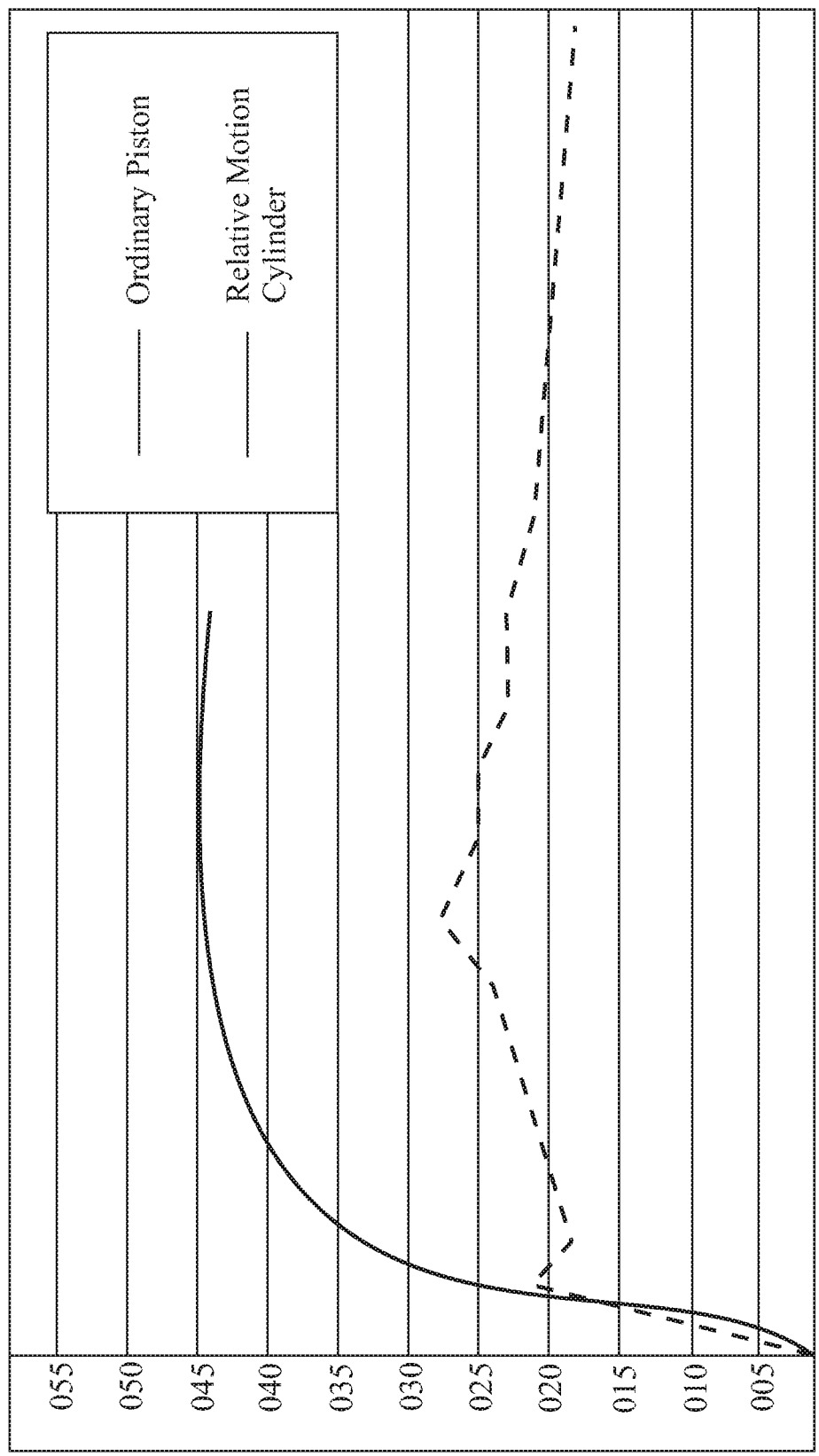
FIG. 41 shows testing results comparing an ordinary and relative motion cylinder for H12C23 emissions, resulting in significantly lower emissions of the disclosed system.
Figure 42:
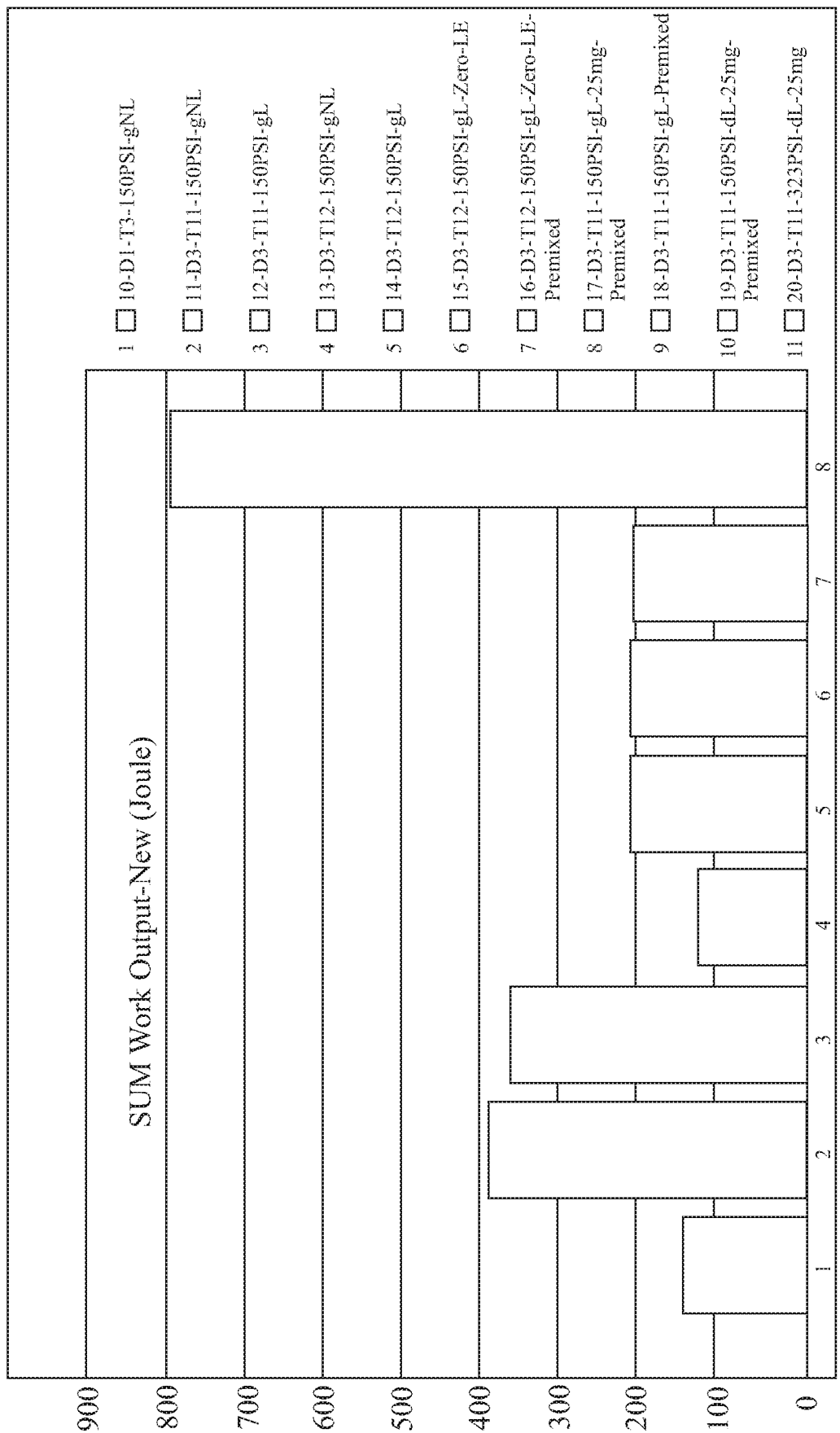
FIG. 42 shows work output of various disclosed systems, where more work energy availability offers higher torque/horse power output or lower fuel requirements.

As shown in FIG. 38, testing a relative Motion cylinder shows variable possible results, using similar cylinder size and fuel volume, that enhanced a base conventional output of 154 Joules, to new possible 795 of Joules output, which is 500% possible enhancement. And the difference is based on gaining energy from time as a form of energy, calculated by using the new energy equation:

E=½Mf*g$^2$*t where (t) is time lapse of universal acceleration to reach the average speed of piston.

The distance traveled by a piston, in the new Relative Motion calculations, present physical and relative distances that are different, and the slower the piston is, the shorter the relative distance, and the lesser the energy input requirements will be.

In comparison, our method does not mistakenly, correct relative distances to physical ones, as we see in special relativity, but a virtual distance is taken at its face value in calculating energy requirements As shown in FIG. 39, exhaust enhancements, shows possible near zero output of the Hydro carbons HC, and of the non-manageable products like CO, NO and other free radicals.

Therefore, the system includes a dedicated compression space, a primary combustion space and interface, including a diameter smaller than an internal cylinder diameter, a secondary combustion space and interface, where the secondary space has an equal diameter to the diameter of the cylinder, and a channel separating a compression space from the primary combustion space. Separate combustion and compression spaces, timing of occupying structure forces, a suction force during expansion stroke, dimensions/diameters, advancement of occupying structure competing with combustion fluid for space, how forces are applied to various surfaces, these are all factors that are specifically configured/included to effect the purposes described herein.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A mechanical engine cylinder system, comprising:
   a cylinder including an internal space; an occupying structure; and a crankshaft piston;
   wherein the internal space of the cylinder is modified by the occupying structure, having dedicated compression and dedicated combustion spaces;
   wherein the occupying structure provides a surface interface with the dedicated compression space and wherein the occupying structure is responsive to a force application mechanism, and
   wherein the occupying structure completely contains within a cavity, a primary combustion space and a secondary combustion space, during an early stage of a power stroke, and
   wherein, the occupying structure has an edge, that separates the primary and secondary combustion spaces,
   wherein combustion pressure applied to the crankshaft piston is applied to a smaller surface area of the crankshaft piston during an early part of an expansion stroke and to a larger surface area of the crankshaft piston during a later part of an expansion stroke and wherein the force application mechanism is configured to apply a retracting force to the occupying structure during the expansion stroke, and
   wherein combustion pressure applied to occupying structure, applies a net-force to the occupying structure, in the direction of the crankshaft piston, during early part of an expansion stroke, and in the direction of camshaft during a later part of an expansion stroke,
   wherein surfaces of occupying structure, and crankshaft piston, are configured such that, a disengagement happens during an expansion stroke, between the occupying structure and crankshaft piston; and
   wherein the motion of occupying structure, during an early part of expansion stroke, creates a suction force of compression fluid into the dedicated compression space.

2. The system of claim 1, wherein the system is configured such that combustion occurs within a cavity of the occupying structure, with a diameter smaller than the internal diameter of cylinder.

3. The system of claim 1, where time of acceleration is reduced, such that a stroke power output can be done using less fuel requirement.

4. The system of claim 1, wherein the occupying structure cavity, has an edge facing toward a camshaft.

5. The system of claim 4, wherein the occupying structure edge, causes turbulent motion of combustion fluid for more complete burning.

6. The system of claim 4, wherein an edge under pressure within the cavity of occupying structure, causes a progressive advance of occupying structure within the cylinder, competing with combustion fluid for space, and causing less fluid intake requirements.

7. The system of claim 1, wherein the engagement of the occupying structure and crankshaft piston, is a cone shape engagement.

8. The system of claim 1, wherein the advance of occupying structure under combustion forces, creates suction forces of compression fluid.

9. The system of claim 1, wherein the surface sizing of the occupying structure and of crankshaft piston, balances combustion forces, such that disengagement happens without mechanical interference during a power stroke.

10. The system of claim 1, wherein the force application mechanism is responsive to throttle position by way of throttle position sensors such that one or more forces applied to the occupying structure are dependent on throttle position.

11. The system of claim 1, wherein the force application mechanism is configured to apply an advancing force to the occupying structure during the expansion stroke.

12. The system of claim 1, wherein any turbocharge forces used to increase fluid compression, during an early part of a power stroke, is part of a force application mechanism.

13. The system of claim 1, wherein the force application mechanism includes electromagnetic actuator.

14. The system of claim 1, wherein the force application mechanism includes a magnetic induction system.

15. The system of claim 1, wherein the force application mechanism includes a hydraulic system, configured as engine cylinders dedicated for fluid compression.

16. The system of claim 1, wherein the system is configured to cause engine deceleration by applying a retracting force to the occupying structure.

17. The system of claim 16, wherein four strokes are performed along with every reciprocating cycle of a crankshaft piston.

18. The system of claim 16, wherein friction between crankshaft piston and cylinder, is reduced as a function of time, where every stroke of a four-stroke Relative Motion cylinder, is a power stroke.

19. The system of claim 1, wherein the system is configured to cause engine acceleration by applying an advancing force to the occupying structure.

20. The system of claim 1, wherein the occupying structure is cooled by a cooling jacket.

21. The system of claim 1, wherein the advance of occupying structure, decompresses part of compressed fluid remaining out of the compression space, providing a cooling effect to the cylinder head.

22. The system of claim 1, wherein the advance of occupying structure, by dragging combustion fluid, minimizes the vibration caused by initial forces of combustion.

23. The system of claim 1, wherein four independent strokes, are carried in two separate compression and combustion spaces.

24. The system of claim 1, wherein the occupying structure is a movable part relative to the cylinder.

25. A method of introducing an occupying structure within a cylinder system,
   the system including a cylinder including an internal space, and the system including a crankshaft piston;
   the method comprising: modifying an internal space of a cylinder using the occupying structure such that pressure applied to the crankshaft piston is applied to a smaller surface area of the crankshaft piston during an early part of an expansion stroke and to a larger surface area of the crankshaft piston during a later part of the expansion stroke and wherein the occupying structure is responsive to a force application mechanism;
   and executing a pressure-increasing action within a cavity of the occupying structure to apply pressure to both the occupying structure and the crankshaft piston, such that, the occupying structure accelerates in the direction of the crankshaft during an early stage of power stroke, and in opposite direction during a later stage of power stroke, due to changing the direction of net force applied to occupying structure surfaces;

wherein the occupying structure includes an elongated cylindrical body to be accommodated within the internal space, the elongated cylindrical body defines a first cavity of primary space and a second cavity of a secondary space;

wherein the occupying structure competes with fluid in filling the space of displaced volume created by the motion of a crankshaft piston during an expansion stroke and wherein the force application mechanism is configured to apply an advancing force to the occupying structure during the expansion stroke; and wherein the occupying structure is introduced such that volume filled by the combustion fluid is smaller than the volume displaced by the crankshaft piston due to the occupying structure competing with combustion fluid for space within the cylinder.

26. The method of claim 25, wherein the cylinder is a hydraulic cylinder, and wherein the fluid is a hydraulic fluid.

27. The method of claim 25, wherein the cylinder is a combustion cylinder, and wherein the fluid is a combustible fluid.

* * * * *